(12) United States Patent
Toyoda et al.

(10) Patent No.: US 8,385,816 B2
(45) Date of Patent: Feb. 26, 2013

(54) RELAY DEVICE AND RELAY METHOD

(75) Inventors: Yoshimi Toyoda, Kawasaki (JP);
Satoshi Maeda, Kawasaki (JP); Hideki Yoshitome, Kawasaki (JP); Hirokazu Shimada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 230 days.

(21) Appl. No.: 13/071,176

(22) Filed: Mar. 24, 2011

(65) Prior Publication Data

US 2011/0171902 A1 Jul. 14, 2011

Related U.S. Application Data

(63) Continuation of application No. PCT/JP2008/068597, filed on Oct. 14, 2008.

(51) Int. Cl.
*H04B 1/60* (2006.01)

(52) U.S. Cl. ...... 455/9; 455/7; 455/8; 455/10; 455/11.1; 455/12.1; 370/15; 370/16; 370/17; 370/18; 370/19

(58) Field of Classification Search ............ 455/7–25, 455/69–70; 370/315–320
See application file for complete search history.

(56) References Cited

U.S. PATENT DOCUMENTS

| | | | |
|---|---|---|---|
| 2007/0281643 A1 | 12/2007 | Kawai | |
| 2008/0089689 A1* | 4/2008 | Sakama | 398/115 |
| 2011/0032910 A1* | 2/2011 | Aarflot et al. | 370/335 |
| 2012/0307712 A1* | 12/2012 | Watanabe | 370/315 |
| 2012/0307713 A1* | 12/2012 | Watanabe et al. | 370/315 |

FOREIGN PATENT DOCUMENTS

| | | |
|---|---|---|
| JP | 55-153045 | 11/1980 |
| JP | 62-245827 | 10/1987 |
| JP | 2007-135052 | 5/2007 |
| JP | 2008-11498 | 1/2008 |
| JP | 2008-22144 | 1/2008 |
| JP | 2008-99137 | 4/2008 |
| JP | 2008-516503 | 5/2008 |
| WO | 2006/040653 | 4/2006 |
| WO | 2008/146394 | 12/2008 |

OTHER PUBLICATIONS

Ericsson AB; CPRI Specification V4.0 (Jun. 30, 2008); Common Public Radio Interface (CPRI); Interface Specification; Jun. 30, 2008.

Notice of Rejection issued for corresponding Japanese Patent Application No. 2010-533742 mailed Aug. 7, 2012 with English translation.

International Search Report issued for corresponding International Patent Application No. PCT/JP2008/068597, mailed Jan. 20, 2009.

\* cited by examiner

*Primary Examiner* — Fayyaz Alam
(74) *Attorney, Agent, or Firm* — Myers Wolin, LLC

(57) ABSTRACT

A relay device that monitors and controls common public radio interface (CPRI) links that are links using CPRIs functioning as interfaces for connecting multiple relay devices included in a radio base station detects a disconnected CPRI link by monitoring, via the CPRI links, relay information containing communication data and control data. The relay device distributes a control content, such as a forced link disconnection that forcibly disconnect a CPRI link or notransmission that stops the transmission of the communication data, with respect to each CPRI link in accordance with a connecting location of the CPRI link in which a link disconnection is detected. The relay device monitors and controls each CPRI link.

6 Claims, 15 Drawing Sheets

FIG.1
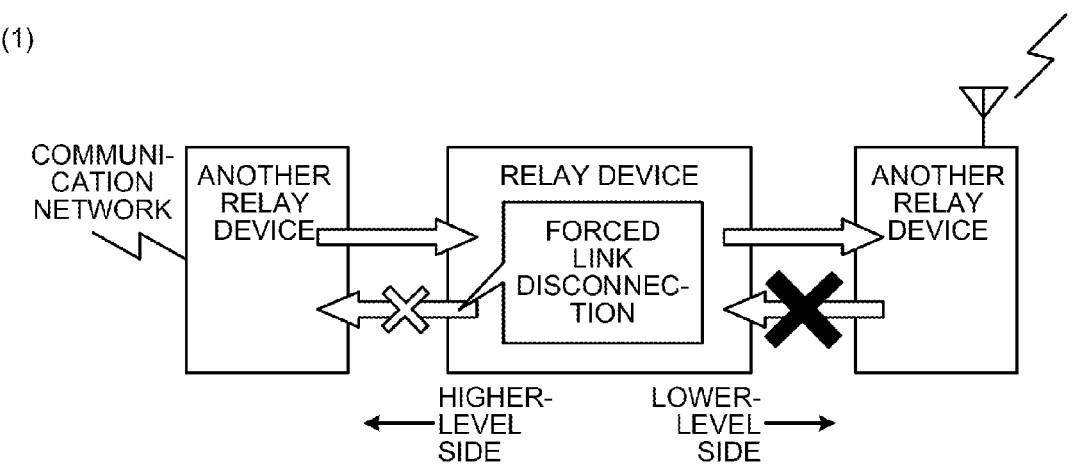
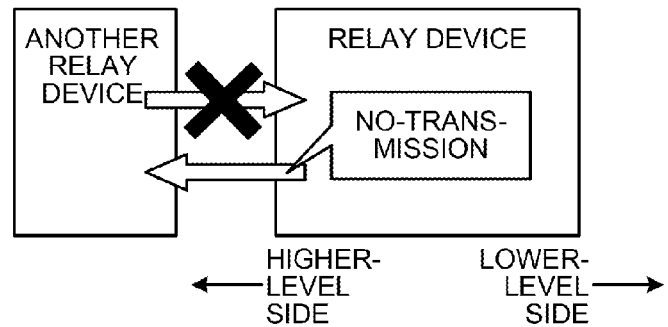

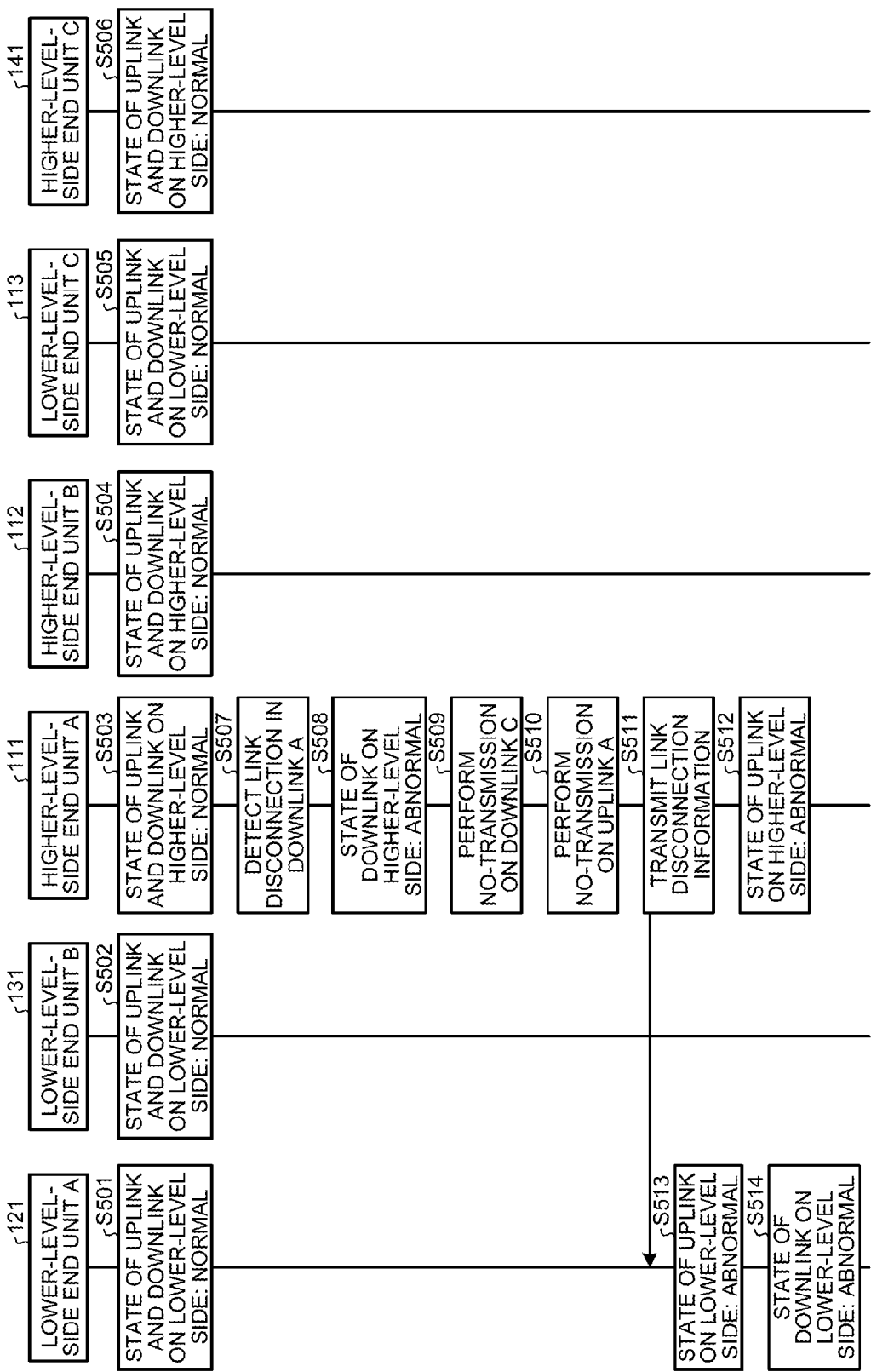

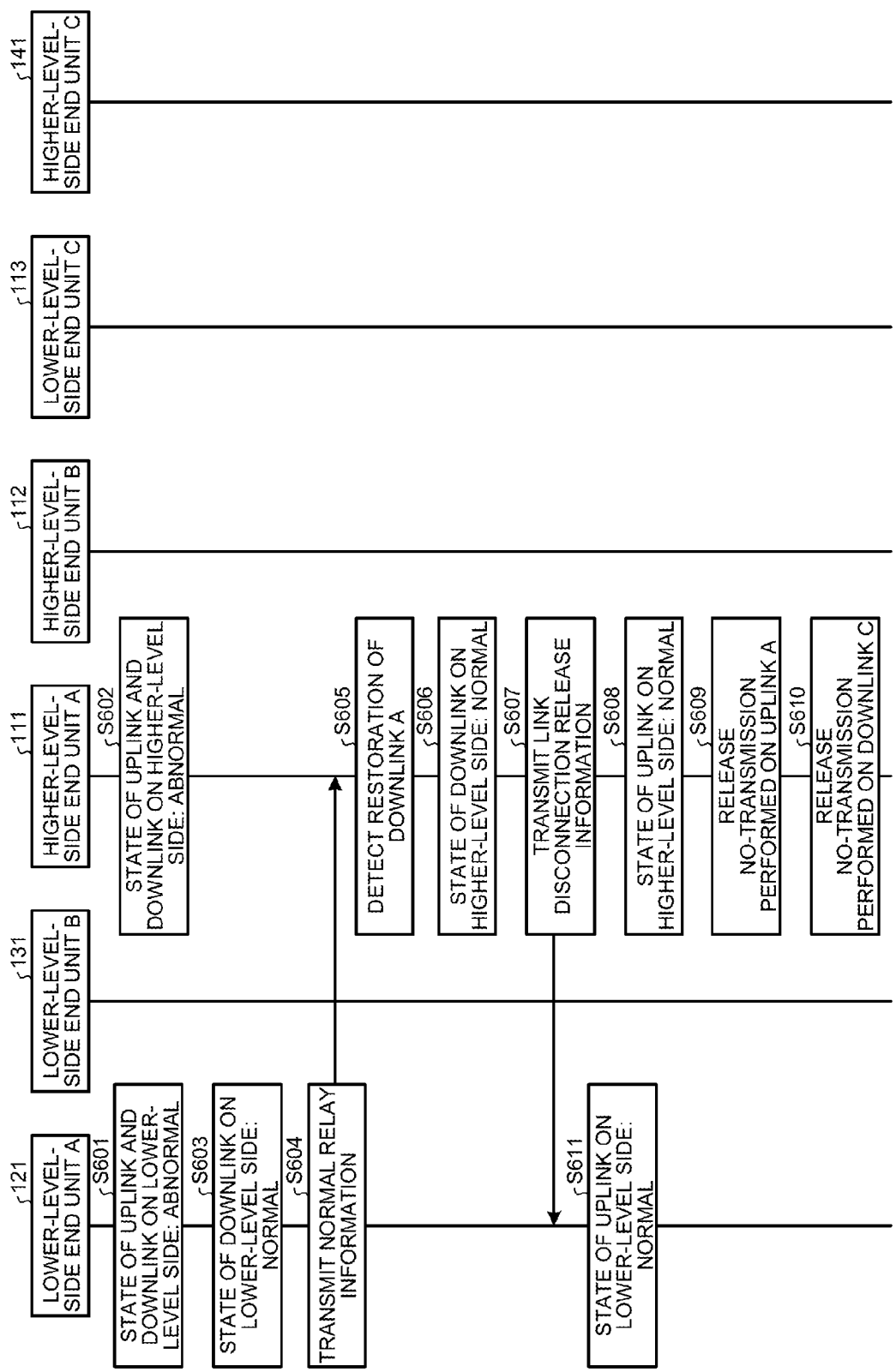

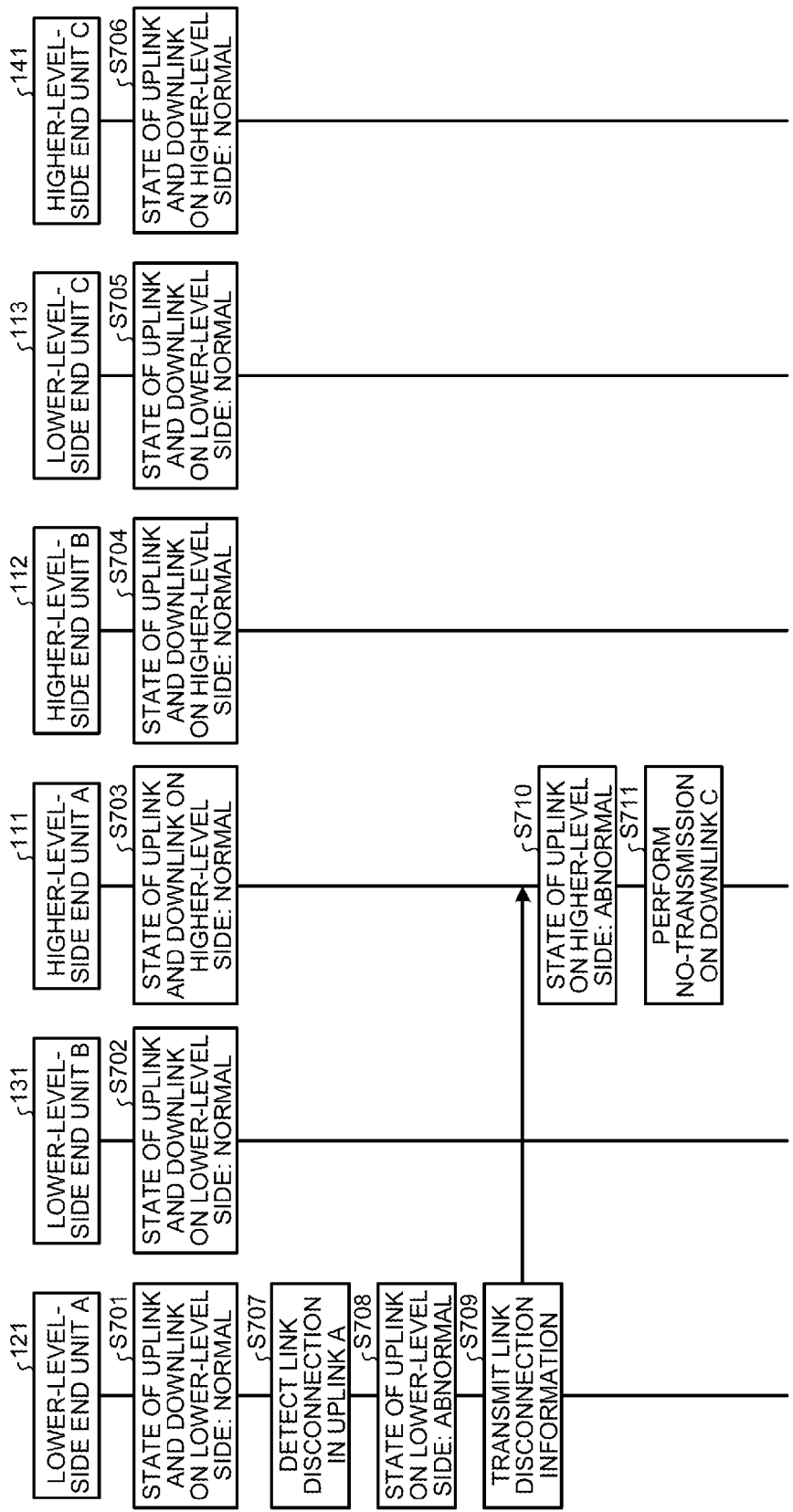

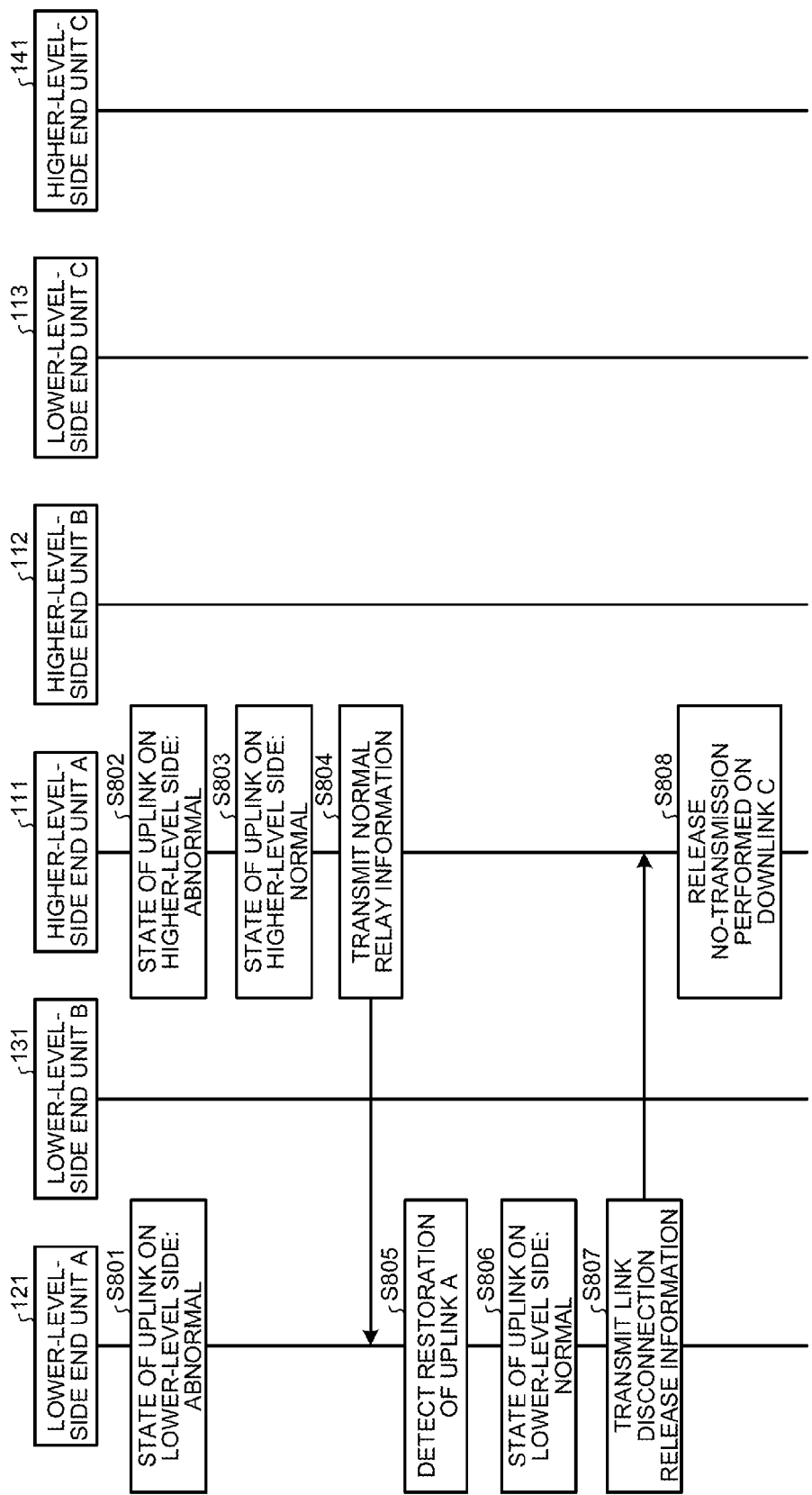

RELAY DEVICE AND RELAY METHOD

CROSS-REFERENCE TO RELATED APPLICATIONS

This application is a continuation of International Application No. PCT/JP2008/068597, filed on Oct. 14, 2008, the entire contents of which are incorporated herein by reference.

FIELD

The embodiment discussed herein is directed to a relay device and a relay method.

BACKGROUND

Conventionally, in radio base stations, internal networks are formed by connecting multiple radio equipment control (REC) devices in a mesh manner. The REC devices (hereinafter, referred to as "relay devices") mentioned here mean devices that control communication of the internal networks and perform a relay process on communication data.

The relay devices are connected to other relay devices using optical fibers that are called CPRI links that conform to interfaces of the CPRI standard that is the internal interface standard of the radio base stations. Each relay device continuously monitors whether transmission/reception between the relay devices is in a normal state, i.e., whether a CPRI link is established, and controls, in accordance with the monitoring result, disconnection/restoration of each CPRI link.

However, with the conventional relay devices, if any one of the CPRI links connected to its own relay device is disconnected, there may be a case in which another normal CPRI link (i.e., CPRI link is being established) is also recognized as being disconnected.

Accordingly, if conventional relay devices are used, there may be a case in which communication data cannot be relayed even though normal CPRI links still remain, which is a problem.

For example, a case will be described in which two relay devices (hereinafter, referred to as a "device B1" and a "device B2") are connected, in parallel, on the higher-level device side (higher-level side) of a conventional relay device (hereinafter, referred to as a "device A"), and a single relay device (hereinafter, referred to as a "device C") is connected on the lower-level device side (lower-level side) of the device A. In such a case, the device B1 and the device B2 on the higher-level side share the device C via the device A. The higher-level devices are, for example, radio base station control devices and the lower-level device is, for example, a mobile station device.

With the above-described device configuration, if the connection of a CPRI link from the higher-level side, i.e., between the device A and the device B1, to the lower-level side (hereinafter, referred to as a "downlink") is disconnected, the device A detects that the disconnection has occurred in the downlink of the CPRI link from the device B1.

Subsequently, the device A performs a process for recognizing that a disconnection has occurred in the downlink of a CPRI link (normal link) from the device A to the device C. Therefore, the device B2 cannot communicate with the device C, with which the device B2 can in practice communicate.

Accordingly, there is a problem, if a CPRI link connected to its own relay device becomes abnormal, in how to implement a relay device that can maintain a data relay process using a normal CPRI link.

Patent Document 1: Japanese Laid-open Patent Publication No. 55-153045
Patent Document 2: Japanese Laid-open Patent Publication No. 62-245827

SUMMARY

According to an aspect of an embodiment of the invention, a relay device for monitoring and controlling common public radio interface (CPRI) links that are links using CPRIs functioning as interfaces for connecting multiple relay devices included in a radio base station, includes a link disconnection detecting unit that detects a CPRI link that is disconnected by monitoring, via the CPRI links, relay information containing communication data and control data that contains connection state information on the CPRI links; a distribution unit that distributes a control content with respect to each CPRI link in accordance with a connecting location of a CPRI link in which a link disconnection is detected by the link disconnection detecting unit; and a no-transmission unit that transmits only the control data of the relay information that is transmitted via the detected CPRI link. When the link disconnection detecting unit detects a link disconnection in a downlink direction of a CPRI link connected to a relay device on a downlink side, the link disconnection detecting unit notifies the no-transmission unit of CPRI links connected to multiple relay devices that share the relay device on the downlink side, and the no-transmission unit transmits only the control data to the relay devices connected to the notified CPRI links. When the link disconnection detecting unit detects a link disconnection in a downlink direction of a CPRI link connected to a relay device on an uplink side, the link disconnection detecting unit notifies the no-transmission unit of the CPRI link, in which a link disconnection is detected, as a first CPRI link and notifies the no-transmission unit of a CPRI link connected to a relay device on a downlink side as a second CPRI link, and the no-transmission unit transmits only the control data to the relay device connected to the notified first CPRI link and transmits, as the relay information from the relay device connected to the first CPRI link, only the control data to the relay device connected to the notified second CPRI link.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 is a schematic diagram illustrating the outline of a relay device according to an embodiment of the present invention;

FIG. 12 is a sequence diagram illustrating the flow of a process performed, at the time of detection of a link disconnection, by the relay device according to the embodiment (No. 3);

FIG. 13 is a sequence diagram illustrating the flow of a process performed, at the time of restoration, by the relay device according to the embodiment (No. 3);

FIG. 14 is a sequence diagram illustrating the flow of a process performed, at the time of detection of a link disconnection, by the relay device according to the embodiment (No. 4); and FIG. 15 is a sequence diagram illustrating the flow of a process performed, at the time of restoration, by the relay device according to the embodiment (No. 4).

DESCRIPTION OF EMBODIMENT

Figure 2:
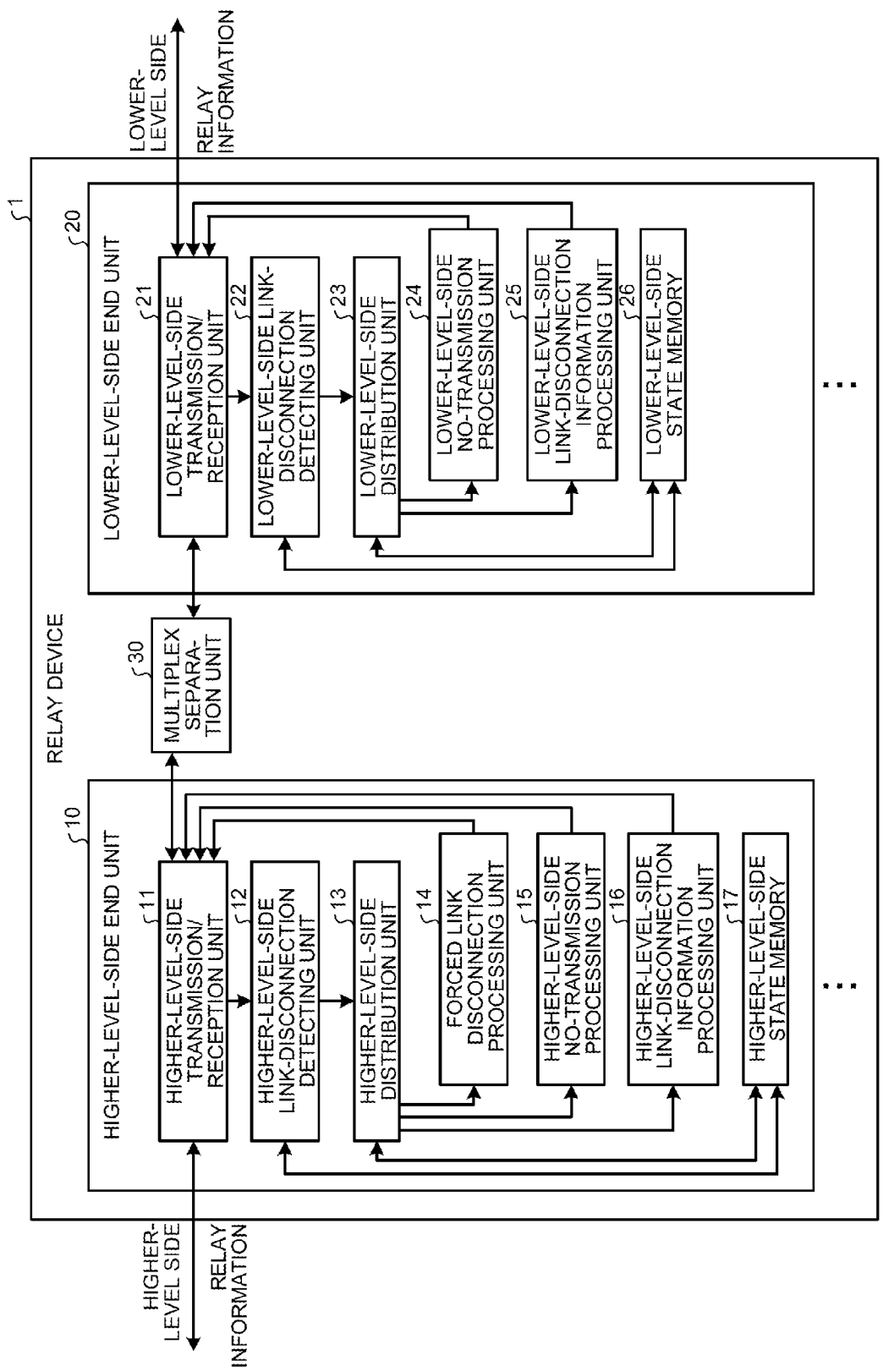
FIG. 2 is a block diagram illustrating the configuration of the relay device according to the embodiment.

Preferred embodiments of the present invention will be explained with reference to accompanying drawings. The embodiments are not limited to the relay device, the relay method, and the relay program disclosed in the present invention.

In the following, first, the outline of a relay device, a relay method, and a relay program according to an embodiment of the present invention will be described. Then, the configuration of the relay device, the device configuration in a radio base station, the flow of a process performed by the relay device, and an advantage of the embodiment will be described in the order they are listed in this sentence.

Outline of a relay device according to the embodiment

First, the outline of a radio equipment control (REC) device (hereinafter, referred to as a "relay device") according to an embodiment of the present invention will be described with reference to FIG. 1. FIG. 1 is a schematic diagram illustrating the outline of the relay device according to the embodiment of the present invention.

A relay device in a radio base station according to the embodiment can be connected to multiple relay devices using optical fibers called CPRI links that conform to interfaces of the common public radio interface (CPRI) standard.

From among multiple relay devices, a side to which another communication network that is external to the radio base station is connected is defined as the higher-level side. From among relay devices arranged on the opposite side from the higher-level side, a side arranged with a relay device that has an antenna and that can transmits/receives radio waves using the antenna is defined as the lower-level side.

A CPRI link that connects a relay device and other relay devices has an uplink that transmits relay information from the lower-level side to the higher-level side and a downlink that transmits relay information from the higher-level side to the lower-level side. The relay devices monitors whether each of the uplink and the downlink is established.

The relay information relayed via the CPRI link contains both control data for setting, in accordance with a manner determined by the CPRI standard, the state whether a link disconnection occurs and communication data for transmitting/receiving radio waves using an antenna.

As illustrated in (1) of FIG. 1, the device configuration will be described in which another relay device is connected on the higher-level side of the above-described subject relay device and another relay device is connected on the lower-level side of the subject relay device.

In such a case, if abnormality occurs in the uplink of a CPRI link connected on the lower-level side and relay information is not transmitted (hereinafter, referred to as a "link disconnection"), the relay device detects that a link disconnection has occurred in the uplink on the lower-level side.

At this time, the relay device forcibly disconnects the uplink on the higher-level side (hereinafter, referred to as a "forced link disconnection"). Accordingly, the relay device can relay data between relay devices without transmitting abnormal relay information to the higher-level side.

Even if another single relay device is further connected on the higher-level side of the other relay device that is arranged on the higher-level side, a forced link disconnection can be performed in the uplink on the higher-level side by performing the process described above.

Furthermore, as illustrated in (2) of FIG. 1, with the device configuration in which another relay device is connected on the higher-level side of the relay device, if a link disconnection occurs in the downlink of the CPRI link that is connected on the higher-level side, the relay device detects that the link disconnection has occurred in the downlink on the higher-level side.

Here, of relay information containing both communication data and control data, the relay device stops transmitting, to another relay device, communication data (hereinafter, referred to as "no-transmission") and transmits only control data (hereinafter, referred to as "link disconnection information") that is used to notify of a link disconnection.

In this case, by performing no-transmission and transmitting the link disconnection information, it is possible to notify of the link disconnection without transmitting abnormal communication data to another relay device on the higher-level side and is possible to maintain a relay process of data between relay devices.

The relay device according to the embodiment monitors, for each CPRI link, CPRI links connected to the relay device and controls, for each CPRI link in accordance whether the uplink is disconnected or whether the downlink is disconnected, the forced link disconnection or the no-transmission. Accordingly, the relay device can maintain, using a CPRI link in which a link is established, the relay process on the relay information without transmitting/receiving abnormal communication data to/from another relay device.

Configuration of the Relay Device

In the following, the configuration of the relay device according to the embodiment will be described with reference to FIG. 2. FIG. 2 is a block diagram illustrating the configuration of the relay device according to the embodiment.

As illustrated in FIG. 2, a relay device 1 according to the embodiment includes a higher-level-side end unit 10 that is connected to a CPRI link on the higher-level side, a lowerlevel-side end unit 20 that is connected to the CPRI link on the lower-level side, and a multiplex separation unit 30 that relays between the higher-level-side end unit 10 and the lower-level-side end unit 20.

Here, if multiple relay devices are connected to the relay device 1 on the higher-level side, the relay device 1 has the same number of CPRI links and higher-level-side end units 10 as there are multiple relay devices. In such a case, multiple higher-level-side end units 10 are connected to a single multiplex separation unit 30.

Furthermore, if multiple relay devices are connected to the relay device 1 on the lower-level side, the relay device 1 has the same number of CPRI links and lower-level-side end units 20 as there are multiple relay devices. In such a case, multiple lower-level-side end units 20 are connected to the single multiplex separation unit 30.

The higher-level-side end unit 10 includes a higher-level-side transmission/reception unit 11 that transmits relay information to the higher-level side using a CPRI link, a higher-level-side link-disconnection detecting unit 12 that detects a link disconnection occurring on the higher-level side in accordance with the relay information, and a higher-level-side distribution unit 13 that distributes a process in accordance with the obtained condition.

Furthermore, the higher-level-side end unit 10 also includes a forced link-disconnection processing unit 14 that performs a forced link disconnection, a higher-level-side no-transmission processing unit 15 that performs no-transmission on a CPRI link, a higher-level-side link-disconnection information processing unit 16 that processes link disconnection information on the higher-level side, and a higher-level-side state memory 17 that holds the state of the link on the higher-level side.

The higher-level-side transmission/reception unit 11 is a processing unit that transmits, using an uplink on the higher-level side, relay information from the relay device 1 to the other relay device on the higher-level side and receives relay information transmitted from the other relay device on the higher-level side to the relay device 1.

Furthermore, the higher-level-side transmission/reception unit 11 also transmits, via the multiplex separation unit 30, relay information from the higher-level-side end unit 10 to the lower-level-side end unit 20 and receives relay information transmitted from the lower-level-side end unit 20 to the higher-level-side end unit 10.

The higher-level-side link-disconnection detecting unit 12 is a processing unit that performs a process for detecting a link disconnection in the downlink on the higher-level side. For example, if the relay information to be transmitted from the other relay device on the higher-level side is not transmitted for a certain time period, the higher-level-side link-disconnection detecting unit 12 recognizes that a link disconnection has occurred.

Furthermore, the higher-level-side link-disconnection detecting unit 12 is a processing unit that performs a process for detecting a link restoration of the downlink on the higher-level side. For example, when receiving normal relay information via a link that is recognized as being disconnected, the higher-level-side link-disconnection detecting unit 12 recognizes that the link has been restored.

In accordance with a disconnected CPRI link and also in accordance with link disconnection detection, link disconnection information, and information on the higher-level-side state memory 17, the higher-level-side distribution unit 13, which is a processing unit, determines a CPRI link to be used and distributes a process for each determined CPRI link.

For example, if the higher-level-side distribution unit 13 receives, from the multiplex separation unit 30, link disconnection information on the lower-level side, the higher-level-side distribution unit 13 distributes a process, i.e., a process for no-transmission performed on the uplink on the higher-level side or a process for transmitting the link disconnection information to the other relay device on the higher-level side.

Furthermore, in accordance with a restored CPRI link and also in accordance with a link restoration detection, link disconnection release information that notifies of the release of a forced link disconnection, and information on the higher-level-side state memory 17, the higher-level-side distribution unit 13 determines a CPRI link to be used and distributes a restoration process for each determined CPRI link.

The forced link-disconnection processing unit 14 is a processing unit that performs, by forcibly stopping the transmission of the relay information, a forced link disconnection process on a CPRI link determined by the higher-level-side distribution unit 13.

Furthermore, by transmitting the stopped relay information to the CPRI link subjected to the forced link disconnection, the forced link-disconnection processing unit 14 also performs a process for releasing the forced link disconnection (hereinafter, referred to as a "link disconnection release").

The higher-level-side no-transmission processing unit 15 is a processing unit that performs no-transmission, on the CPRI link determined by the higher-level-side distribution unit 13, by stopping the transmission of communication data of the relay information that contains both the communication data and the control data and by transmitting only the control data that notifies of a link disconnection.

The higher-level-side no-transmission processing unit 15 also performs a process for releasing the no-transmission, on the CPRI link subjected to the no-transmission, by transmitting the stopped communication data.

For the CPRI link determined by the higher-level-side distribution unit 13, the higher-level-side link-disconnection information processing unit 16 is a processing unit that sets, in the control data of the relay information that contains both the communication data, link disconnection information and also sets whether no-transmission occurs.

The higher-level-side state memory 17 holds, for example, the state, detected by the higher-level-side link-disconnection detecting unit 12, of whether the uplink and the downlink of the CPRI link connected on the higher-level side is disconnected.

The lower-level-side end unit 20 includes a lower-level-side transmission/reception unit 21 that transmits relay information to the lower-level side using a CPRI link, a lower-level-side link-disconnection detecting unit 22 that detects a link disconnection occurring on the lower-level side in accordance with the relay information, and a lower-level-side distribution unit 23 that distributes a process in accordance with the obtained condition.

Furthermore, the lower-level-side end unit 20 also includes a lower-level-side no-transmission processing unit 24 that performs no-transmission on a CPRI link, a lower-level-side link-disconnection information processing unit 25 that processes link disconnection information on the lower-level side, and a lower-level-side state memory 26 that holds the state of the link on the lower-level side.

The lower-level-side transmission/reception unit 21 is a processing unit that transmits, using an uplink on the lower-level side, relay information from the relay device 1 to the other relay device on the lower-level side and receives relay information transmitted from the other relay device on the lower-level side to the relay device 1.

Furthermore, the lower-level-side transmission/reception unit 21 also transmits, via the multiplex separation unit 30, relay information from the lower-level-side end unit 20 to the higher-level-side end unit 10 and receives relay information transmitted from the higher-level-side end unit 10 to the lower-level-side end unit 20.

The lower-level-side link-disconnection detecting unit 22 is a processing unit that performs a process for detecting a link disconnection in the uplink on the lower-level side. For example, if the relay information to be transmitted from the other relay device on the lower-level side is not transmitted for a certain time period, the lower-level-side link-disconnection detecting unit 22 recognizes that a link disconnection has occurred.

Furthermore, the lower-level-side link-disconnection detecting unit 22 also performs a process for detecting a link restoration of the uplink on the lower-level side. For example, when receiving normal relay information via a link that is recognized as being disconnected, the lower-level-side link-disconnection detecting unit 22 recognizes that the link has been restored.

In accordance with a disconnected CPRI link and also in accordance with link disconnection detection, link disconnection information, and information on the lower-level-side state memory 26, the lower-level-side distribution unit 23, which is a processing unit, determines a CPRI link to be used and distributes a process for each determined CPRI link.

For example, if the lower-level-side distribution unit 23 receives, from the multiplex separation unit 30, link disconnection information on the higher-level side, the lower-level-side distribution unit 23 distributes a process, i.e., a process for no-transmission performed on the uplink on the lower-level side or a process for transmitting the link disconnection information to the other relay device on the lower-level side.

Furthermore, in accordance with a restored CPRI link and also in accordance with a link restoration detection, link disconnection release information, and information on the lower-level-side state memory 26, the lower-level-side distribution unit 23 determines a CPRI link to be used and distributes a restoration process for each determined CPRI link.

The lower-level-side no-transmission processing unit 24 is a processing unit that performs the no-transmission, on the CPRI link determined by the lower-level-side distribution unit 23, by stopping the transmission of communication data of the relay information that contains both the communication data and the control data and by transmitting only the control data that notifies of a link disconnection.

The lower-level-side no-transmission processing unit 24 also performs a process for releasing the no-transmission, on the CPRI link subjected to the no-transmission, by transmitting the stopped communication data.

For the CPRI link determined by the lower-level-side distribution unit 23, the lower-level-side link-disconnection information processing unit 25 is a processing unit that sets, in the control data of the relay information that contains both the communication data and the control data, link disconnection information and also sets whether no-transmission occurs.

The lower-level-side state memory 26 holds, for example, the state, detected by the lower-level-side link-disconnection detecting unit 22, of whether the uplink and the downlink of the CPRI link connected on the lower-level side is disconnected.

The multiplex separation unit 30 is a processing unit that performs a multiplex process, on normal relay information, link disconnection information, and no-transmission information that are transmitted from the multiple higher-level-side end units 10, to the lower-level-side end unit 20 specified by the higher-level-side end unit 10.

Furthermore, the multiplex separation unit 30 also transmits, to the multiple higher-level-side end units 10 on the higher-level side, normal relay information, link disconnection information, and no-transmission information that are transmitted from the lower-level-side end unit 20 in a separated manner.

Figure 3:
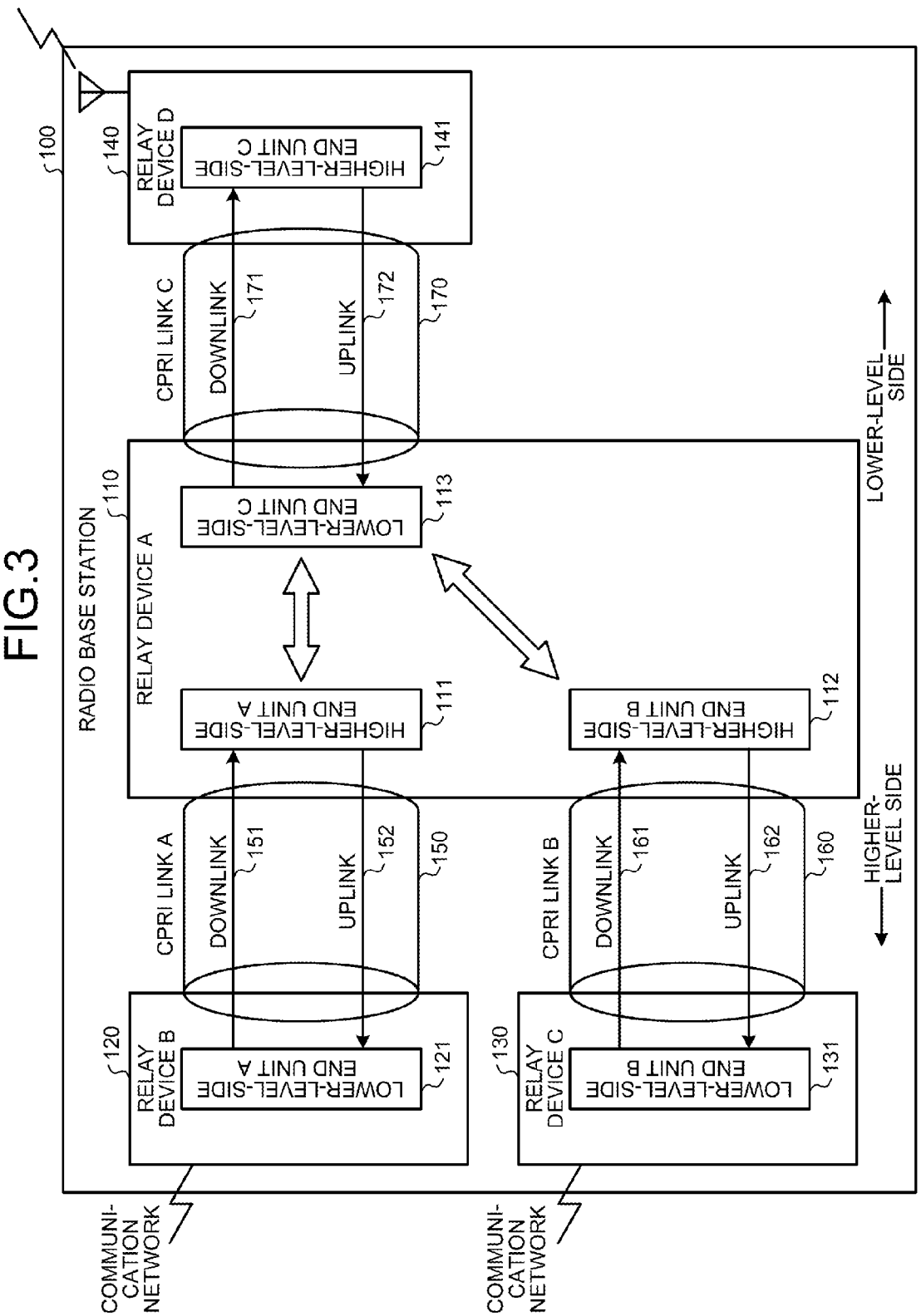
FIG. 3 is a schematic diagram illustrating the device configuration in a radio base station according to the embodiment.

Device configuration in the radio base station In the following, the device configuration in the radio base station according to the embodiment will be described with reference to FIG. 3. FIG. 3 is a schematic diagram illustrating the device configuration in the radio base station according to the embodiment. This device configuration is applied to all of the description given in the embodiment.

As illustrated in FIG. 3, in a radio base station 100, a relay device B 120 and a relay device C 130 are connected, in parallel, on the higher-level side of a relay device A 110, and a relay device D 140 is connected on the lower-level side of the relay device A 110. In this case, both the relay device B 120 and the relay device C 130 share the relay device D 140 via the relay device A 110.

The relay device B 120 and the relay device C 130 are connected to communication networks that are external to the radio base station on the higher-level side. In contrast, the relay device D 140 has an antenna and can transmit/receive radio waves using the antenna.

A CPRI link A 150 is arranged between the relay device A 110 and the relay device B 120, a CPRI link B 160 is arranged between the relay device A 110 and the relay device C 130, and a CPRI link C 170 is arranged between the relay device A 110 and the relay device D 140.

The CPRI link A 150 includes both a downlink A 151 and an uplink A 152. The higher-level side of the CPRI link A 150 is connected to a lower-level-side end unit A 121 in the relay device B 120. The lower-level side of the CPRI link A 150 is connected to a higher-level-side end unit A 111 in the relay device A 110.

The CPRI link B 160 includes both a downlink B 161 and an uplink B 162. The higher-level side of the CPRI link B 160 is connected to a lower-level-side end unit B 131 in the relay device C 130. The lower-level side of the CPRI link B 160 is connected to a higher-level-side end unit B 112 in the relay device A 110.

The CPRI link C 170 includes both a downlink C 171 and an uplink C 172. The higher-level side of the CPRI link C 170 is connected to a lower-level-side end unit C 113 in the relay device A 110. The lower-level side of the CPRI link C 170 is connected to a higher-level-side end unit C 141 in the relay device D 140.

In the following, four cases of monitoring methods and control methods performed by the relay device according to the embodiment will be described with reference to FIGS. 4 to 7. FIGS. 4 to 7 are schematic diagrams illustrating monitoring methods and control methods performed by the relay device (No. 1 to No. 4).

Figure 4:
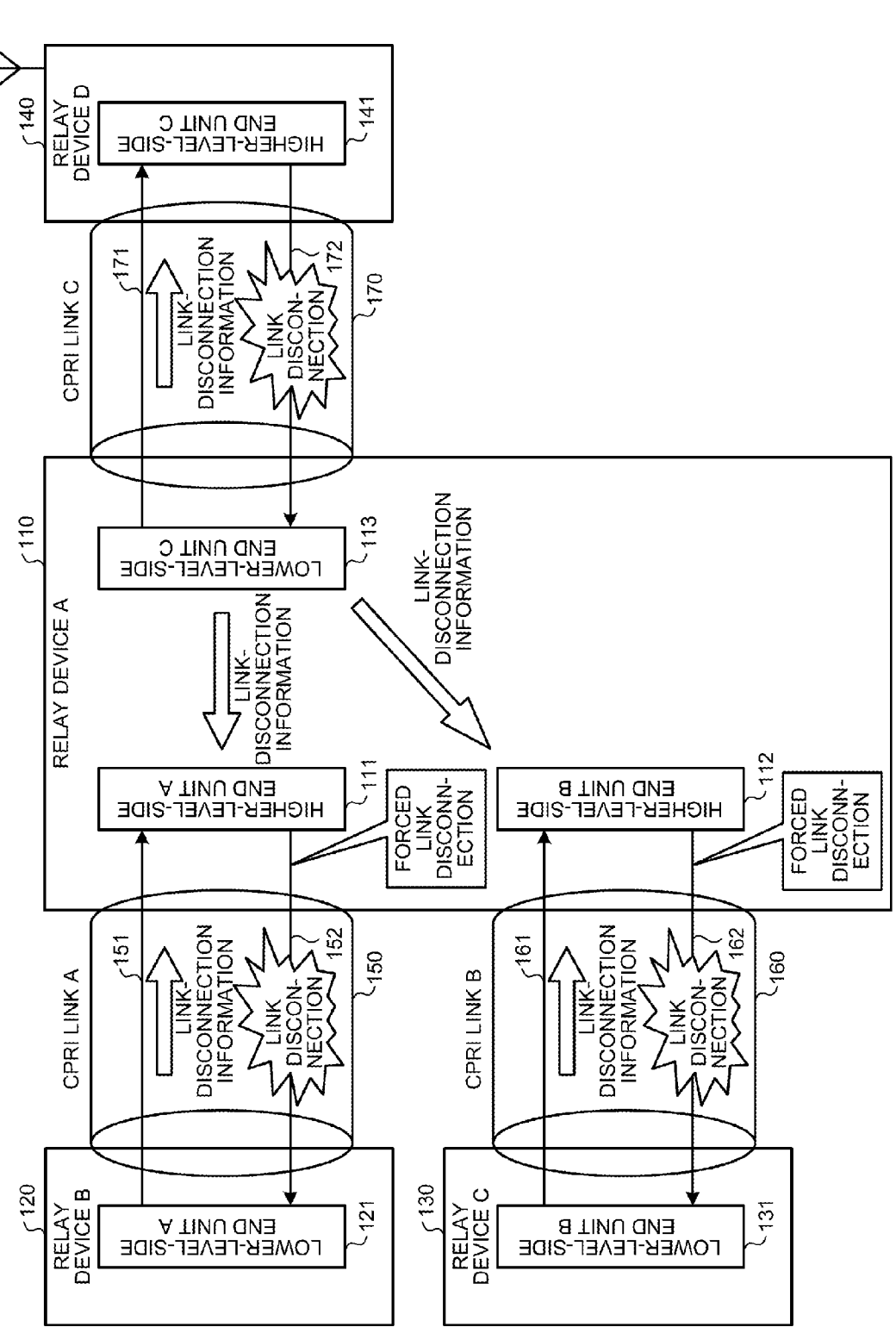
FIG. 4 is a schematic diagram illustrating a monitoring method and a control method performed by the relay device (No. 1)

First, as illustrated in FIG. 4, a case in which a link disconnection occurs in the uplink C 172 on the lower-level side will be described. The lower-level-side end unit C 113 detects that a link disconnection has occurred in the uplink C 172 because the relay information to be transmitted from the relay device D 140 is not transmitted for a predetermined time period.

Then, the lower-level-side end unit C 113 transmits link disconnection information to the higher-level-side end unit A 111 and the higher-level-side end unit B 112. Thereafter, in accordance with the received link disconnection information, the higher-level-side end unit A 111 performs a forced link disconnection on the uplink A 152, and the higher-level-side end unit B 112 performs a forced link disconnection on the uplink B 162.

The lower-level-side end unit A 121 and the lower-level-side end unit B 131 detect that a link disconnection has occurred in the uplink A 152 and the uplink B 162, respectively. Then, the lower-level-side end unit A 121 and the lower-level-side end unit B 131 transmit link disconnection information to the higher-level-side end unit A 111 and the higher-level-side end unit B 112, respectively.

By performing the control using the above-described method, even if another relay device (not illustrated) is connected on the higher-level side of the relay device B 120 or the relay device C 130, the relay device B 120 or the relay device C 130 can perform a forced link disconnection on the uplinks.

Furthermore, even if data of the relay information that is transmitted via, for example, the uplink C 172 is cut off, i.e., is abnormal, due to a link disconnection in the uplink C 172, the relay device A 110 does not transmit abnormal relay information to the other relay device on the higher-level side.

Figure 5:
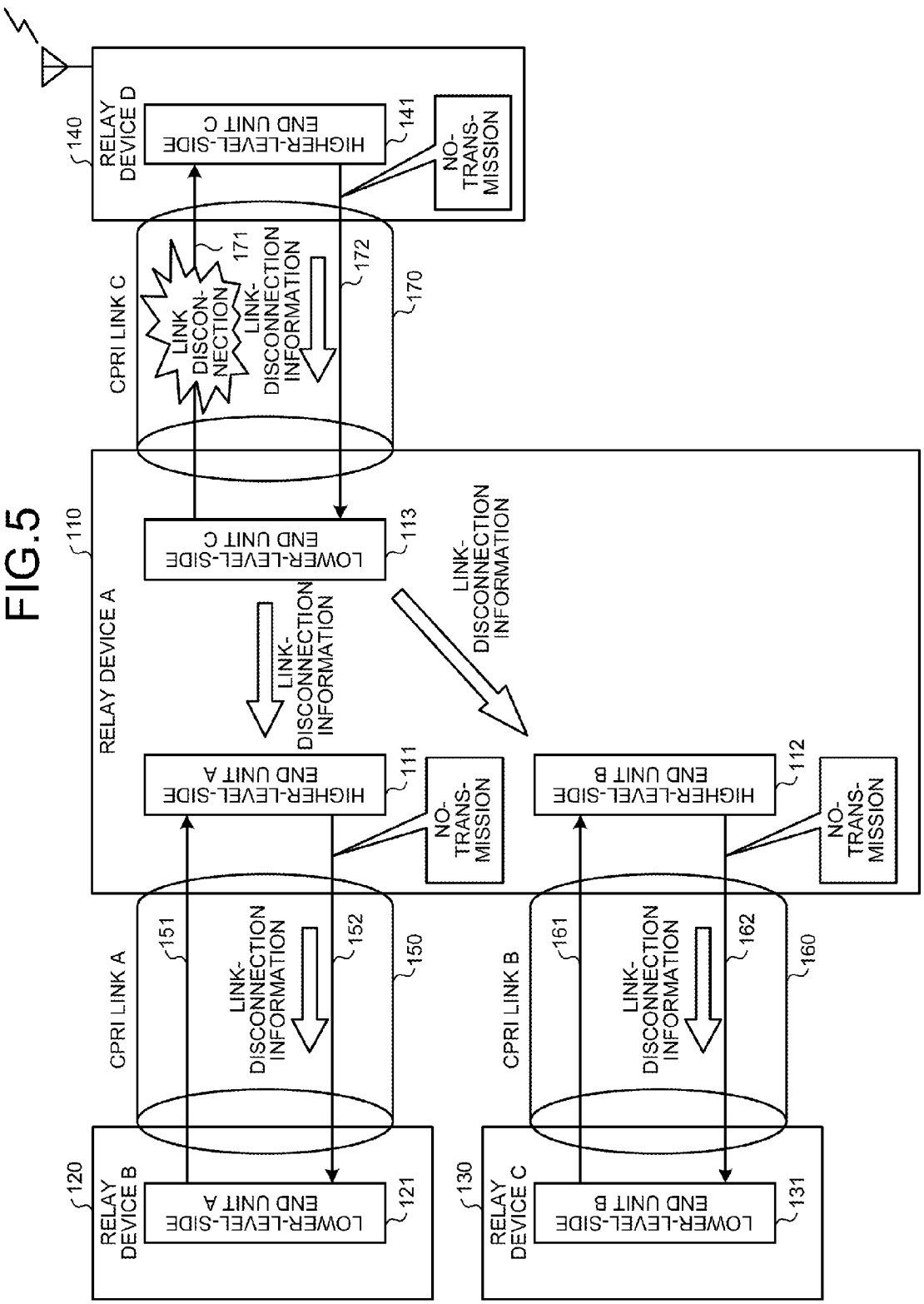
FIG. 5 is a schematic diagram illustrating a monitoring method and a control method performed by the relay device (No. 2)

In the following, as illustrated in FIG. 5, a case in which a link disconnection occurs in the downlink C 171 on the lower-level side will be described. The higher-level-side end unit C 141 detects that a link disconnection has occurred in the downlink C 171 because the relay information to be transmitted from the relay device A 110 is not transmitted for a predetermined time period.

Then, the higher-level-side end unit C 141 performs no-transmission on the uplink C 172 and transmits link disconnection information to the lower-level-side end unit C 113. Thereafter, in accordance with the received link disconnection information, the lower-level-side end unit C 113 transmits the link disconnection information to the higher-level-side end unit A 111 and the higher-level-side end unit B 112.

The higher-level-side end unit A 111 also performs no-transmission on the uplink A 152 and transmits the link disconnection information to the lower-level-side end unit A 121. The higher-level-side end unit B 112 performs no-transmission on the uplink B 162 and transmits the link disconnection information to the lower-level-side end unit B 131.

By performing the control using the above-described method, even if another relay device (not illustrated) is connected on the higher-level side of the relay device B 120 or the relay device C 130, the relay device B 120 or the relay device C 130 can perform no-transmission on the uplinks.

Furthermore, even if the relay information transmitted via the downlink C 171 is abnormal due to the link disconnection in the downlink C 171, the relay device A 110 can transmit link disconnection information, i.e., control data, without transmitting abnormal communication data to the other relay device on the higher-level side.

Figure 6:
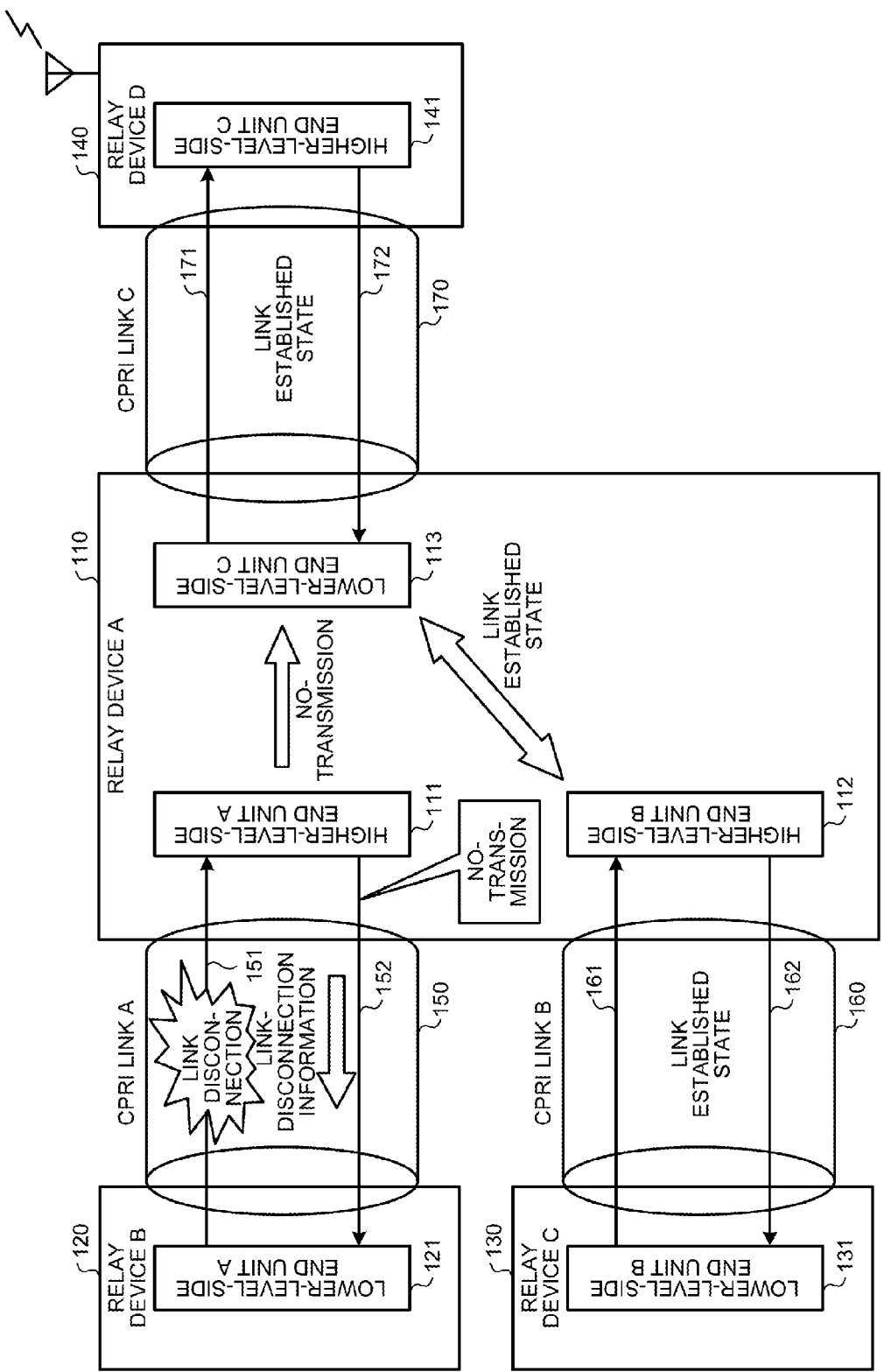
FIG. 6 is a schematic diagram illustrating a monitoring method and a control method performed by the relay device (No. 3)

In the following, as illustrated in FIG. 6, a case in which a link disconnection occurs in the downlink A 151 on the higher-level side will be described. The higher-level-side end unit A 111 detects that a link disconnection has occurred in the downlink A 151 because the relay information to be transmitted from the relay device B 120 is not transmitted for a predetermined time period.

Then, the higher-level-side end unit A 111 performs no-transmission on the uplink A 152 and transmits link disconnection information to the lower-level-side end unit A 121. Furthermore, the higher-level-side end unit A 111 performs no-transmission, with respect to the downlink C 171, only on the relay information transmitted from the higher-level-side end unit A 111.

By performing the control using the above-described method, even if the downlink A 151 that is one of the links between the relay device B 120 and the relay device C 130 that share the relay device D 140 is disconnected, it is possible to maintain the state in which a link between the CPRI link B 160 and the CPRI link C 170 is established.

Furthermore, even if the relay information transmitted via the downlink A 151 is abnormal due to the link disconnection in the downlink A 151, the relay device A 110 can continue the relay process, on the relay information, between the relay device D 140 and the relay device B 120 without transmitting abnormal communication data to the other relay device on the lower-level side.

Figure 7:
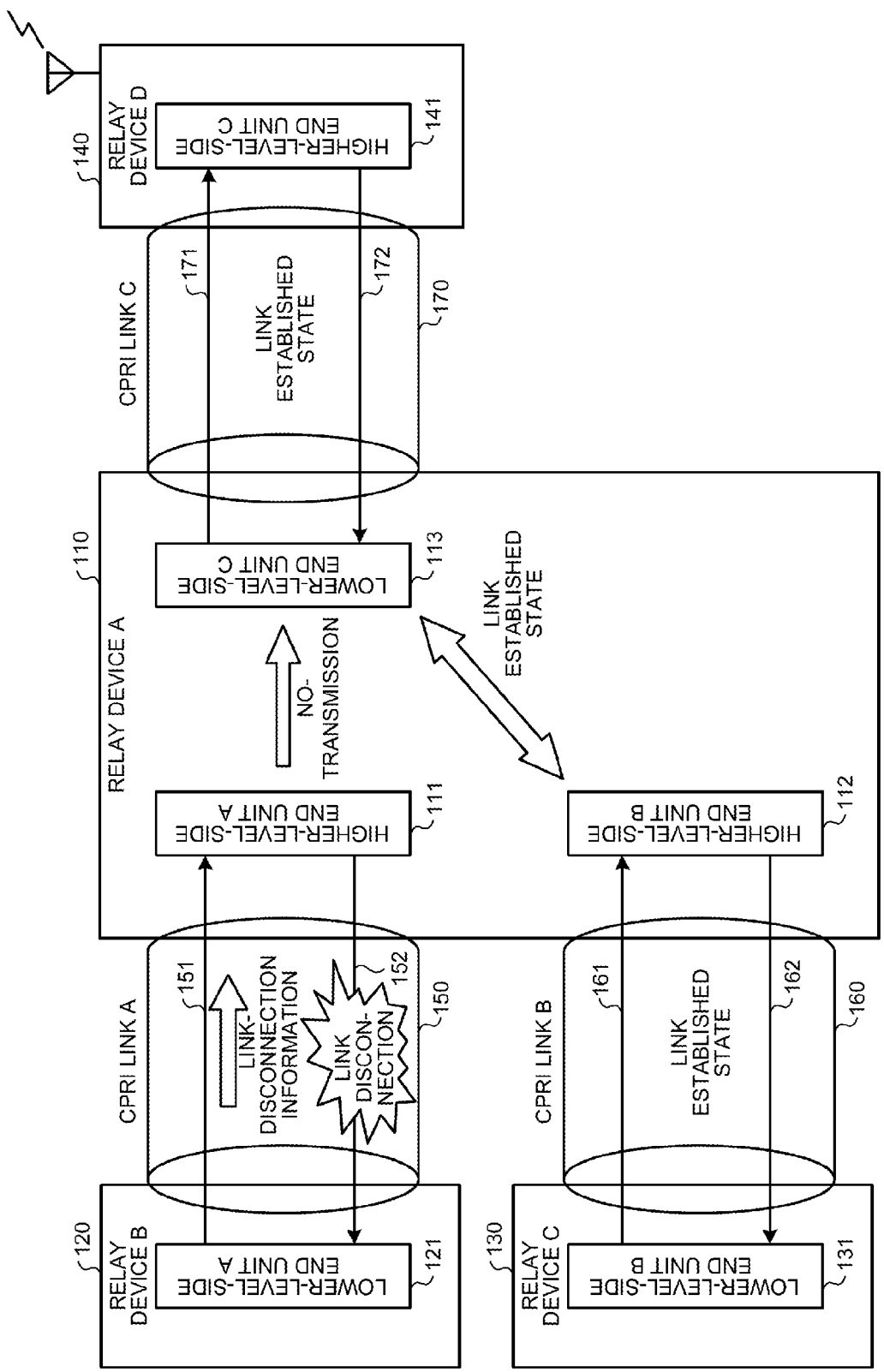
FIG. 7 is a schematic diagram illustrating a monitoring method and a control method performed by the relay device (No. 4)

In the following, as illustrated in FIG. 7, a case in which a link disconnection occurs in the uplink A 152 on the higher-level side will be described. The lower-level-side end unit A 121 detects that a link disconnection has occurred in the uplink A 152 because the relay information to be transmitted from the relay device A 110 is not transmitted for a predetermined time period.

Then, the lower-level-side end unit A 121 transmits link disconnection information to the higher-level-side end unit A 111. Thereafter, the higher-level-side end unit A 111 performs no-transmission, with respect to the downlink C 171, only on relay information transmitted from the higher-level-side end unit A 111.

By performing the control using the above-described method, even if the uplink A 152 that is one of the links between the relay device B 120 and the relay device C 130 that share the relay device D 140 is disconnected, it is possible to maintain the state in which a link between the CPRI link B 160 and the CPRI link C 170 is established.

Furthermore, even if the relay information transmitted via the uplink A 152 is abnormal due to the link disconnection in the uplink A 152, the relay device A 110 can continue the relay process, on the relay information, between the relay device D 140 and the relay device B 120 without transmitting abnormal communication data to the other relay device on the lower-level side.

Flow Performed by the Relay Device

In the following, the flow of processes performed, in four cases at the time of detection or restoration of a link disconnection, by the relay device according to the embodiment will be described with reference to FIGS. 8 to 15.

Figure 8:
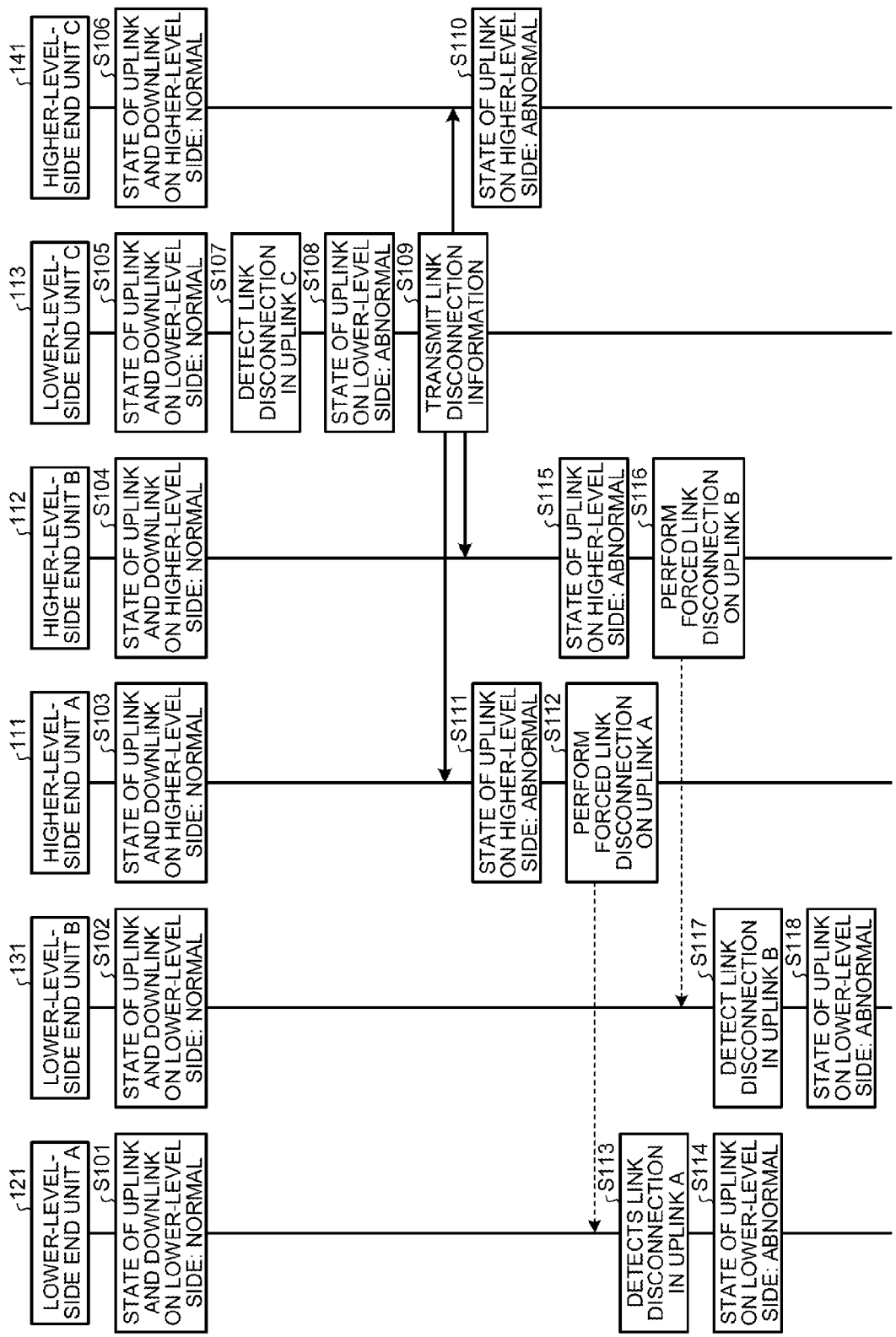
FIG. 8 is a sequence diagram illustrating the flow of a process performed, at the time of detection of a link disconnection, by the relay device according to the embodiment (No. 1)
Figure 9:
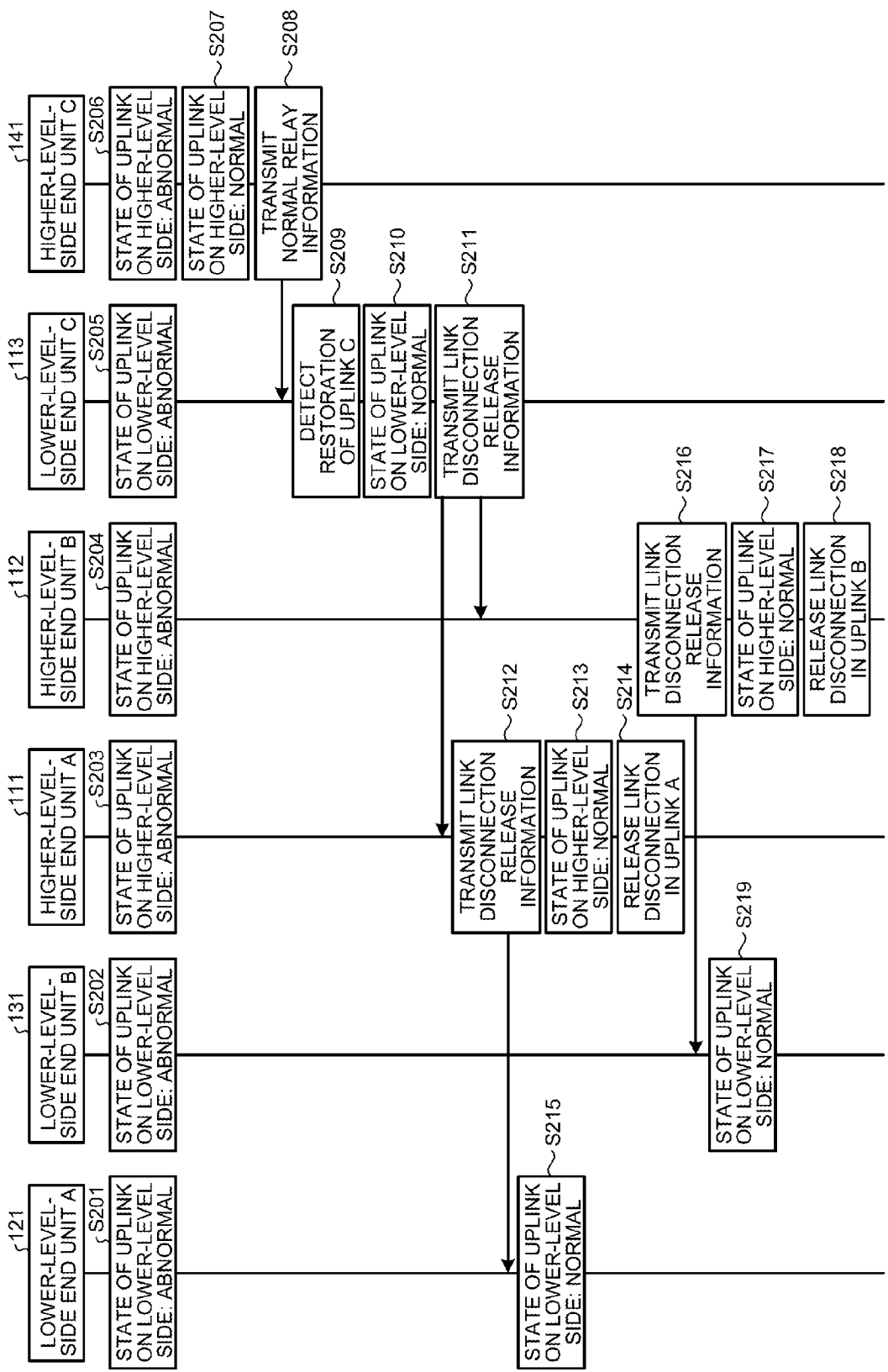
FIG. 9 is a sequence diagram illustrating the flow of a process performed, at the time of restoration, by the relay device according to the embodiment (No. 1)

FIGS. 8 and 9 are sequence diagrams corresponding to FIG. 4. FIG. 8 is a sequence diagram illustrating the flow of a process performed, at the time of detection of a link disconnection, by the relay device according to the embodiment (No. 1). FIG. 9 is a sequence diagram illustrating the flow of a process performed, at the time of restoration, by the relay device according to the embodiment (No. 1).

First, as illustrated in FIG. 8, a case in which a link disconnection occurs in the uplink C 172 will be described. If all of the links are normal, the lower-level-side end unit A 121 sets the state of the uplink and the downlink on the lower-level side to normal (Step S101), and the lower-level-side end unit B 131 sets the state of the uplink and the downlink on the lower-level side to normal (Step S102).

Furthermore, the higher-level-side end unit A 111 sets the state of the uplink and the downlink on the higher-level side to normal (Step S103), and the higher-level-side end unit B 112 sets the state of the uplink and the downlink on the higher-level side to normal (Step S104).

Furthermore, the lower-level-side end unit C 113 sets the state of the uplink and the downlink on the lower-level side to normal (Step S105), and the higher-level-side end unit C 141 sets the state of the uplink and the downlink on the higher-level side to normal (Step S106).

In this state, if a link disconnection occurs in the uplink C 172, the lower-level-side end unit C 113 detects the link disconnection in the uplink C 172 (Step S107) and changes the state of the uplink on the lower-level side to abnormal (Step S108).

Then, the lower-level-side end unit C 113 transmits link disconnection information to the higher-level-side end unit C 141, the higher-level-side end unit A 111, and the higher-level-side end unit B 112 (Step S109). In accordance with the received link disconnection information, the higher-level-side end unit C 141 changes the state of the uplink on the higher-level side to abnormal (Step S110).

In accordance with the link disconnection information received from the lower-level-side end unit C 113, the higher-level-side end unit A 111 changes the state of the uplink on the higher-level side to abnormal (Step S111) and performs a forced link disconnection on the uplink A 152 (Step S112).

Then, the lower-level-side end unit A 121 detects the link disconnection in the uplink A 152 (Step S113) and changes the state of the uplink on the lower-level side to abnormal (Step S114).

In accordance with the link disconnection information received from the lower-level-side end unit C 113, the higher-level-side end unit B 112 changes the state of the uplink on the higher-level side to abnormal (Step S115) and performs a forced link disconnection on the uplink B 162 (Step S116).

Then, the lower-level-side end unit B 131 detects a link disconnection in the uplink B 162 (Step S117) and changes the state of the uplink on the lower-level side to abnormal (Step S118). In this state, the relay device A 110, the relay device B 120, the relay device C 130, and the relay device D 140 wait for a restoration of the uplink C 172.

In the following, as illustrated in FIG. 9, a case in which the uplink C 172 is restored will be described. First, if a link disconnection occurs in the uplink C 172, by using the process described above, the state of the uplink on the lower-level side of the lower-level-side end unit A 121 is set to abnormal (Step S201), and the state of the uplink on the lower-level side of the lower-level-side end unit B 131 is set to abnormal (Step S202).

Furthermore, the state of the uplink on the higher-level side of the higher-level-side end unit A 111 is set to abnormal (Step S203), and the state of the uplink on the higher-level side of the higher-level-side end unit B 112 is set to abnormal (Step S204).

The state of the uplink on the lower-level side of the lower-level-side end unit C 113 is set to abnormal (Step S205), and the state of the uplink on the higher-level side of the higher-level-side end unit C 141 is set to abnormal (Step S206).

In this state, if the uplink C 172 is restored, the higher-level-side end unit C 141 returns the state of the uplink on the higher-level side to normal (Step S207) and transmits normal relay information to the lower-level-side end unit C 113 (Step S208).

Then, in accordance with the received normal relay information, the lower-level-side end unit C 113 detects the restoration of the uplink C 172 (Step S209), returns the state of the uplink on the lower-level side to normal (Step S210), and transmits link disconnection release information to the higher-level-side end unit A 111 and the higher-level-side end unit B 112 (Step S211).

In accordance with the link disconnection release information received from the lower-level-side end unit C 113, the higher-level-side end unit A 111 transmits the link disconnection release information to the lower-level-side end unit A 121 (Step S212), returns the state of the uplink on the higher-level side to normal (Step S213), and releases the link disconnection occurring in the uplink A 152 (Step S214).

Then, in accordance with the link disconnection release information received from the higher-level-side end unit A 111, the lower-level-side end unit A 121 returns the state of the uplink on the lower-level side to normal (Step S215).

Furthermore, in accordance with the link disconnection release information received from the lower-level-side end unit C 113, the higher-level-side end unit B 112 transmits the link disconnection release information to the lower-level-side end unit B 131 (Step S216), returns the state of the uplink on the higher-level side to normal (Step S217), and releases the link disconnection occurring in the uplink B 162 (Step S218).

In accordance with the link disconnection release information received from the higher-level-side end unit B 112, the lower-level-side end unit B 131 returns the state of the uplink on the lower-level side to normal (Step S219).

Figure 10:
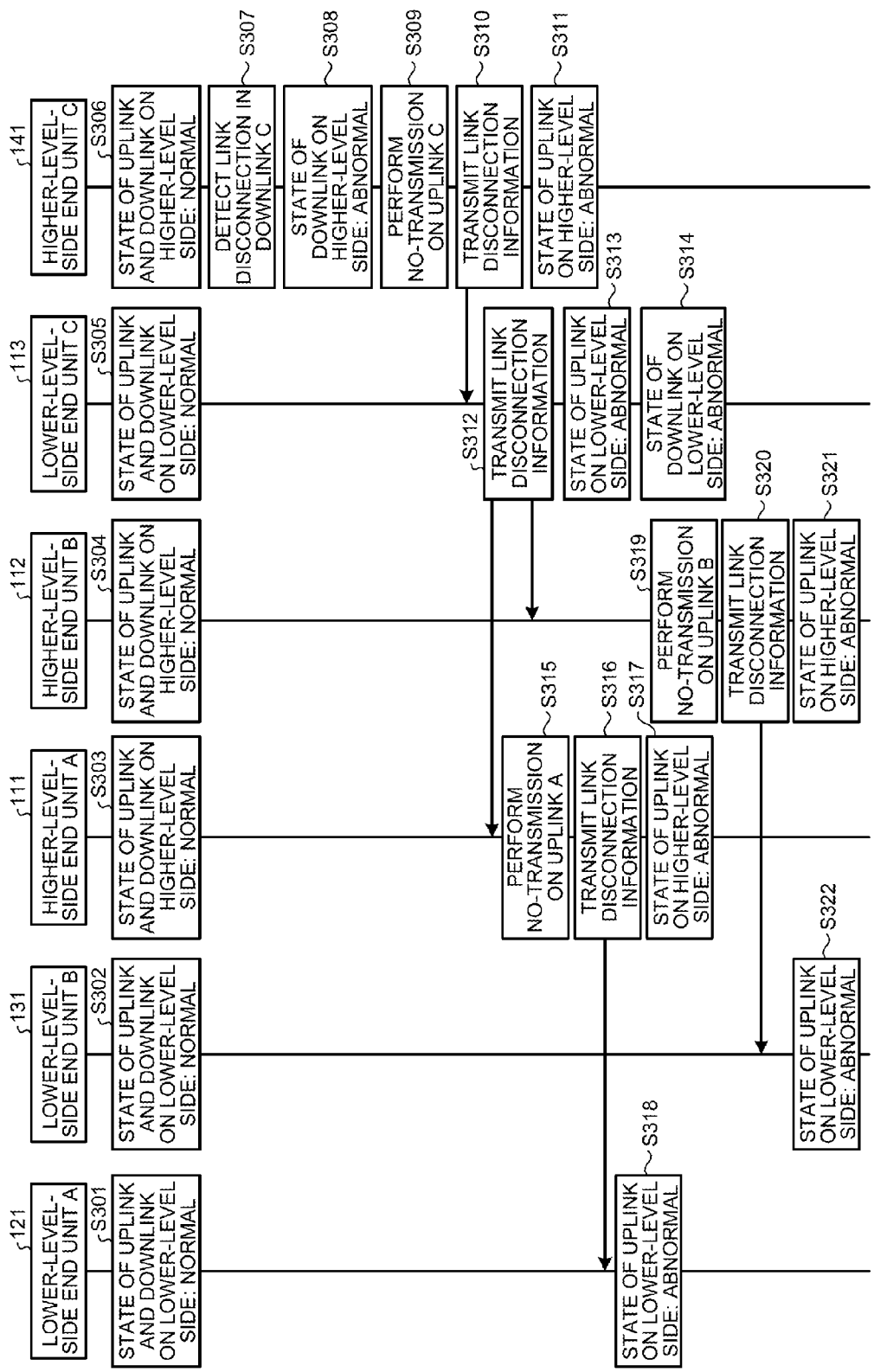
FIG. 10 is a sequence diagram illustrating the flow of a process performed, at the time of detection of a link disconnection, by the relay device according to the embodiment (No. 2)
Figure 11:
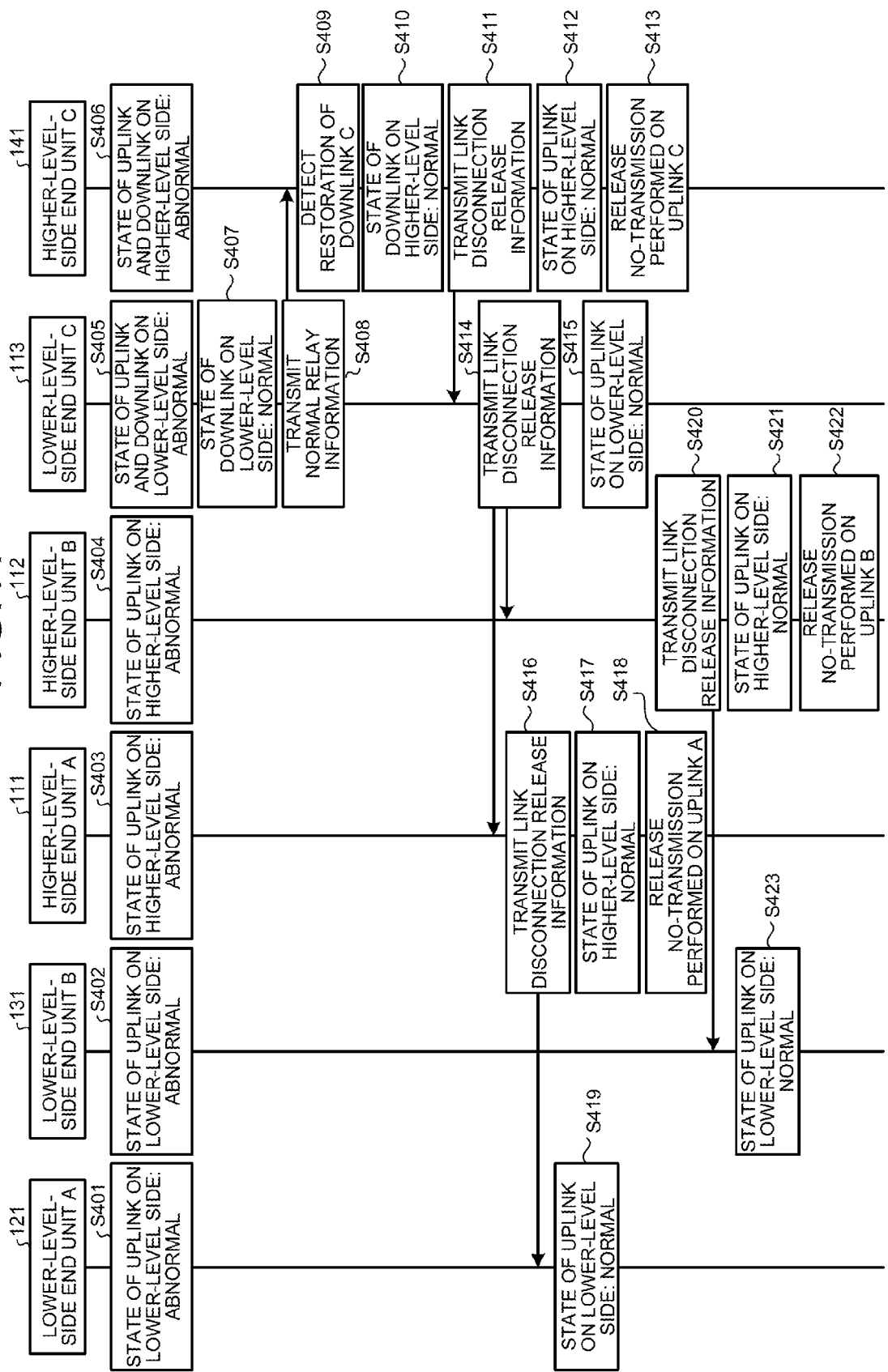
FIG. 11 is a sequence diagram illustrating the flow of a process performed, at the time of restoration, by the relay device according to the embodiment (No. 2)

FIGS. 10 and 11 are sequence diagrams corresponding to FIG. 5. FIG. 10 is a sequence diagram illustrating the flow of a process performed, at the time of detection of a link disconnection, by the relay device according to the embodiment (No. 2). FIG. 11 is a sequence diagram illustrating the flow of a process performed, at the time of restoration, by the relay device according to the embodiment (No. 2).

First, as illustrated in FIG. 10, a case in which a link disconnection occurs in the downlink C 171 will be described. If all of the links are normal, the lower-level-side end unit A 121 sets the state of the uplink and the downlink on the lower-level side to normal (Step S301), and the lower-level-side end unit B 131 sets the state of the uplink and the downlink on the lower-level side to normal (Step S302).

Furthermore, the higher-level-side end unit A 111 sets the state of the uplink and the downlink on the higher-level side to normal (Step S303), and the higher-level-side end unit B 112 sets the state of the uplink and the downlink on the higher-level side to normal (Step S304).

The lower-level-side end unit C 113 sets the state of the uplink and the downlink on the lower-level side to normal (Step S305), and the higher-level-side end unit C 141 sets the state of the uplink and the downlink on the higher-level side to normal (Step S306).

In this state, if a link disconnection occurs in the downlink C 171, the higher-level-side end unit C 141 detects the link disconnection in the downlink C 171 (Step S307) and changes the state of the downlink on the higher-level side to abnormal (Step S308).

Then, the higher-level-side end unit C 141 performs no-transmission on the uplink C 172 (Step S309), transmits link disconnection information to the lower-level-side end unit C 113 (Step S310), and changes the state of the uplink on the higher-level side to abnormal (Step S311).

In accordance with the received link disconnection information from the higher-level-side end unit C 141, the lower-level-side end unit C 113 transmits the link disconnection information to the higher-level-side end unit A 111 and the higher-level-side end unit B 112 (Step S312), changes the state of the uplink on the lower-level side to abnormal (Step S313), and also changes the state of the downlink on the lower-level side to abnormal (Step S314).

In accordance with the link disconnection information received from the lower-level-side end unit C 113, the higher-level-side end unit A 111 performs no-transmission on the uplink A 152 (Step S315), transmits the link disconnection information to the lower-level-side end unit A 121 (Step S316), and changes the state of the uplink on the higher-level side to abnormal (Step S317).

Then, in accordance with the link disconnection information received from the higher-level-side end unit A 111, the lower-level-side end unit A 121 changes the state of the uplink on the lower-level side to abnormal (Step S318).

In accordance with the link disconnection information received from the lower-level-side end unit C 113, the higher-level-side end unit B 112 performs no-transmission on the uplink B 162 (Step S319), transmits the link disconnection information to the lower-level-side end unit B 131 (Step S320), and changes the state of the uplink on the higher-level side to abnormal (Step S321).

In accordance with the link disconnection information received from the higher-level-side end unit B 112, the lower-level-side end unit B 131 changes the state of the uplink on the lower-level side to abnormal (Step S322). In this state, the relay device A 110, the relay device B 120, the relay device C 130, and the relay device D 140 wait for a restoration of the downlink C 171.

In the following, as illustrated in FIG. 11, a case in which the downlink C 171 is restored will be described. First, if a link disconnection occurs in the downlink C 171, by using the process described above, the state of the uplink on the lower-level side of the lower-level-side end unit A 121 is set to abnormal (Step S401), and the state of the uplink on the lower-level side of the lower-level-side end unit B 131 is set to abnormal (Step S402).

Furthermore, the state of the uplink on the higher-level side of the higher-level-side end unit A 111 is set to abnormal (Step S403), and the state of the uplink on the higher-level side of the higher-level-side end unit B 112 is set to abnormal (Step S404).

The state of the uplink and the downlink on the lower-level side of the lower-level-side end unit C 113 is set to abnormal (Step S405), and the state of the uplink and the downlink on the higher-level side of the higher-level-side end unit C 141 is set to abnormal (Step S406).

In this state, if the downlink C 171 is restored, the lower-level-side end unit C 113 returns the state of the downlink on the lower-level side to normal (Step S407) and transmits normal relay information to the higher-level-side end unit C 141 (Step S408).

Then, in accordance with the received normal relay information, the higher-level-side end unit C 141 detects the restoration of the downlink C 171 (Step S409), returns the state of the downlink on the higher-level side to normal (Step S410), and transmits link disconnection release information to the lower-level-side end unit C 113 (Step S411).

Thereafter, the higher-level-side end unit C 141 returns the state of the uplink on the higher-level side to normal (Step S412) and releases the no-transmission performed on the uplink C 172 (Step S413).

In accordance with the link disconnection release information received from the higher-level-side end unit C 141, the lower-level-side end unit C 113 transmits the link disconnection release information to the higher-level-side end unit A 111 and the higher-level-side end unit B 112 (Step S414) and returns the state of the uplink on the lower-level side to normal (Step S415).

In accordance with the link disconnection release information received from the lower-level-side end unit C 113, the higher-level-side end unit A 111 transmits the link disconnection release information to the lower-level-side end unit A 121 (Step S416), returns the state of the uplink on the higher-level side to normal (Step S417), and releases the no-transmission performed on the uplink A 152 (Step S418).

In accordance with the link disconnection release information received from the higher-level-side end unit A 111, the lower-level-side end unit A 121 returns the state of the uplink on the lower-level side to normal (Step S419).

In accordance with the link disconnection release information received from the lower-level-side end unit C 113, the higher-level-side end unit B 112 transmits the link disconnection release information to the lower-level-side end unit B 131 (Step S420), returns the state of the uplink on the higher-level side to normal (Step S421), and releases the no-transmission performed on the uplink B 162 (Step S422).

Then, in accordance with the link disconnection release information received from the higher-level-side end unit B 112, the lower-level-side end unit B 131 returns the state of the uplink on the lower-level side to normal (Step S423).

FIGS. 12 and 13 are sequence diagrams corresponding to FIG. 6. FIG. 12 is a sequence diagram illustrating the flow of a process performed, at the time of detection of a link disconnection, by the relay device according to the embodiment (No. 3). FIG. 13 is a sequence diagram illustrating the flow of a process performed, at the time of restoration, by the relay device according to the embodiment (No. 3).

First, as illustrated in FIG. 12, a case in which a link disconnection occurs in the downlink A 151 will be described. If all of the links are normal, the lower-level-side end unit A 121 sets the state of the uplink and the downlink on the lower-level side to normal (Step S501), and the lower-level-side end unit B 131 sets the state of the uplink and the downlink on the lower-level side to normal (Step S502).

Furthermore, the higher-level-side end unit A 111 sets the state of the uplink and the downlink on the higher-level side to normal (Step S503), and the higher-level-side end unit B 112 sets the state of the uplink and the downlink on the higher-level side to normal (Step S504).

The lower-level-side end unit C 113 sets the state of the uplink and the downlink on the lower-level side to normal (Step S505), and the higher-level-side end unit C 141 sets the state of the uplink and the downlink on the higher-level side to normal (Step S506).

In this state, if a link disconnection occurs in the downlink A 151, the higher-level-side end unit A 111 detects the link disconnection in the downlink A 151 (Step S507) and changes the state of the downlink on the higher-level side to abnormal (Step S508).

Then, the higher-level-side end unit A 111 performs no-transmission on the downlink C 171 (Step S509), also performs no-transmission on the uplink A 152 (Step S510), transmits link disconnection information to the lower-level-side end unit A 121 (Step S511), and changes the state of the uplink on the higher-level side to abnormal (Step S512).

In accordance with the link disconnection information received from the higher-level-side end unit A 111, the lower-level-side end unit A 121 changes the state of the uplink on the lower-level side to abnormal (Step S513) and also changes the state of the downlink on the lower-level side to abnormal (Step S514). In this state, the relay device A 110, the relay device B 120, the relay device C 130, and the relay device D 140 wait for restoration of the downlink A 151.

In the following, as illustrated in FIG. 13, a case in which the downlink A 151 is restored will be described. First, if a link disconnection occurs in the downlink A 151, by using the process described above, the state of the uplink and the downlink on the lower-level side of the lower-level-side end unit A 121 is set to abnormal (Step S601), and the state of the uplink and downlink on the higher-level side of the higher-level-side end unit A 111 is set to abnormal (Step S602).

In this state, if the downlink A 151 is restored, the lower-level-side end unit A 121 returns the state of the downlink on the lower-level side to normal (Step S603) and transmits normal relay information to the higher-level-side end unit A 111 (Step S604).

Then, in accordance with the received normal relay information, the higher-level-side end unit A 111 detects the restoration of the downlink A 151 (Step S605), returns the state of the downlink on the higher-level side to normal (Step S606), and transmits link disconnection release information to the lower-level-side end unit A 121 (Step S607).

The higher-level-side end unit A 111 returns the state of the uplink on the higher-level side to normal (Step S608), releases the no-transmission performed on the uplink A 152 (Step S609), and also releases the no-transmission performed on the downlink C 171 (Step S610).

Then, in accordance with the link disconnection release information received from the higher-level-side end unit A 111, the lower-level-side end unit A 121 returns the state of the uplink on the lower-level side to normal (Step S611).

FIGS. 14 and 15 are sequence diagrams corresponding to FIG. 7. FIG. 14 is a sequence diagram illustrating the flow of a process performed, at the time of detection of a link disconnection, by the relay device according to the embodiment (No. 4). FIG. 15 is a sequence diagram illustrating the flow of a process performed, at the time of restoration, by the relay device according to the embodiment (No. 4).

First, as illustrated in FIG. 14, a case in which a link disconnection occurs in the uplink A 152 will be described. If all of the links are normal, the lower-level-side end unit A 121 sets the state of the uplink and the downlink on the lower-level side to normal (Step S701), and the lower-level-side end unit B 131 sets the state of the uplink and the downlink on the lower-level side to normal (Step S702).

Furthermore, the higher-level-side end unit A 111 sets the state of the uplink and the downlink on the higher-level side to normal (Step S703), and the higher-level-side end unit B 112 sets the state of the uplink and the downlink on the higher-level side to normal (Step S704).

The lower-level-side end unit C 113 sets the state of the uplink and the downlink on the lower-level side to normal (Step S705), and the higher-level-side end unit C 141 sets the state of the uplink and the downlink on the higher-level side to normal (Step S706).

In this state, if a link disconnection occurs in the uplink A 152, the lower-level-side end unit A 121 detects the link disconnection in the uplink A 152 (Step S707), changes the state of the uplink on the lower-level side to abnormal (Step S708) and transmits link disconnection information to the higher-level-side end unit A 111 (Step S709).

In accordance with the link disconnection information received from the lower-level-side end unit A 121, the higher-level-side end unit A 111 changes the state of the uplink on the higher-level side to abnormal (Step S710) performs no-transmission on the downlink C 171 (Step S711).

In this state, the relay device A 110, the relay device B 120, the relay device C 130, and the relay device D 140 wait for a restoration of the uplink A 152.

In the following, as illustrated in FIG. 15, a case in which the uplink A 152 is restored will be described. If a link disconnection occurs in the uplink A 152, by using the process described above, the state of the uplink on the lower-level side of the lower-level-side end unit A 121 is set to abnormal (Step S801), and the state of the uplink on the higher-level side of the higher-level-side end unit A 111 is set to abnormal (Step S802).

In this state, if the uplink A 152 has been restored, the higher-level-side end unit A 111 returns the state of the uplink on the higher-level side to normal (Step S803) and transmits normal relay information to the lower-level-side end unit A 121 (Step S804).

Then, in accordance with the received normal relay information, the lower-level-side end unit A 121 detects the restoration of the uplink A 152 (Step S805), returns the state of the uplink on the lower-level side to normal (Step S806), and transmits link disconnection release information to the higher-level-side end unit A 111 (Step S807).

The higher-level-side end unit A 111 releases the no-transmission performed on the downlink C 171 (Step S808).

Advantage of the Embodiment

As described above, if the relay device according to the embodiment detects that a link disconnection has occurred in an uplink associated with a relay device that is arranged on the lower-level side and that is shared by multiple relay devices, the relay device according to the embodiment performs a forced link disconnection on all uplinks connected on the higher-level side.

Furthermore, if the relay device according to the embodiment detects that a link disconnection has occurred in a downlink associated with another relay device that is arranged on the lower-level side and that is shared by multiple other relay devices, the relay device according to the embodiment performs no-transmission on all uplinks connected on the higher-level side.

In this way, according to the embodiment, even if data of relay information that is transmitted via an link, for example, on the lower-level side is cut off, i.e., is abnormal, the relay device according to the embodiment can perform a relay process without transmitting abnormal relay information to the other relay device on the higher-level side.

Furthermore, if the relay device according to the embodiment detects that a link disconnection has occurred in one of the links associated with the other relay devices that are arranged on the higher-level side and that share the other single relay device connected on the lower-level side, the relay device according to the embodiment performs no-transmission, with respect to the downlink connected on the lower-level side, on relay information from the link subjected to link disconnection.

In this way, according to the embodiment, by maintaining the state in which a link is established between the links that are connected on the lower-level side and on the higher-level side and that are not subjected to the link disconnection, the relay device can also continue a relay process on the relay information without transmitting abnormal relay information to the other relay device on the lower-level side.

Furthermore, in the embodiment described above, in a radio base station, two other relay devices are connected on the higher-level side of the subject relay device and another relay device is connected on the lower-level side of the subject relay device; however, the configuration is not limited thereto. For example, multiple other relay devices can be further connected, in parallel, on the higher-level side and the lower-level side of the subject relay device; another relay device can be connected, in series, on the higher-level side of the other relay device that is arranged on the higher-level side; or another relay device can be connected, in series, on the lower-level side of the other relay device that is arranged on the lower-level side. In such a case, even if a link disconnection occurs in one of the links, it is possible to configure a redundant network in such a manner that a link that is not subjected to the link disconnection is present.

Furthermore, in the embodiment described above, multiple relay devices are connected in the radio base station; however, the device configuration is not limited thereto. For example, any one of the relay devices can be connected to a simple relay device known as a radio equipment (RE) device. In such a case, by connecting the RE device, it is possible to reduce device installation costs and device costs.

Furthermore, in the embodiment described above, the relay device continuously monitors whether CPRI links are established and controls, in accordance with the monitoring result, disconnection/restoration of each CPRI link; however, the configuration is not limited thereto. For example, it is possible to monitor another link except for the CPRI links using the above-described process performed by the relay device. In such a case, even if a CPRI link is newly used, a network can be formed in the radio base station using the existing link, thus reducing the cost of CPRI links.

According to a relay device according to an embodiment, by changing control contents with respect to each CPRI link in accordance with a disconnected CPRI link, it is possible to advantageously control the transmission/reception of relay information.

Accordingly, by keeping the number of CPRI links recognized as being disconnected to a minimum, it is possible to advantageously continue a relay process on the relay information using a CPRI link in which a link is established.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A relay device for monitoring and controlling common public radio interface (CPRI) links that are links using CPRIs functioning as interfaces for connecting multiple relay devices included in a radio base station, the relay device comprising:
    a link disconnection detecting unit that detects a CPRI link that is disconnected by monitoring, via the CPRI links, relay information containing communication data and control data that contains connection state information on the CPRI links;
    a distribution unit that distributes a control content with respect to each CPRI link in accordance with a connecting location of a CPRI link in which a link disconnection is detected by the link disconnection detecting unit; and
    a no-transmission unit that transmits only the control data of the relay information that is transmitted via the detected CPRI link, wherein
    when the link disconnection detecting unit detects a link disconnection in a downlink direction of a CPRI link connected to a relay device on a downlink side, the link disconnection detecting unit notifies the no-transmission unit of CPRI links connected to multiple relay devices that share the relay device on the downlink side,
    the no-transmission unit transmits only the control data to the relay devices connected to the notified CPRI links,
    when the link disconnection detecting unit detects a link disconnection in a downlink direction of a CPRI link connected to a relay device on an uplink side, the link disconnection detecting unit notifies the no-transmission unit of the CPRI link, in which a link disconnection is detected, as a first CPRI link and notifies the no-transmission unit of a CPRI link connected to a relay device on a downlink side as a second CPRI link, and
    the no-transmission unit transmits only the control data to the relay device connected to the notified first CPRI link and transmits, as the relay information from the relay device connected to the first CPRI link, only the control data to the relay device connected to the notified second CPRI link.

2. The relay device according to claim 1, wherein
    when the link disconnection detecting unit detects a link disconnection in an uplink direction of a CPRI link connected to a relay device on a downlink side, the link disconnection detecting unit notifies the no-transmission unit of the CPRI link, in which a link disconnection is detected, as a first CPRI link and notifies the no-transmission unit of a CPRI link connected to a relay device on a downlink side as a second CPRI link,
    the no-transmission unit transmits only the control data to the relay device connected to the notified first CPRI link and transmits, as the relay information from the relay device connected to the first CPRI link, only the control data to the relay device connected to the notified second CPRI link,
    when the link disconnection detecting unit detects a link disconnection in an uplink direction of a CPRI link connected to a relay device on an uplink side, the link disconnection detecting unit notifies the no-transmission unit of a CPRI link connected to a relay device on a downlink side, and
    the no-transmission unit transmits, as relay information from a relay device connected to the detected CPRI link in which a link disconnection is detected, only the control data to the relay device connected to the notified CPRI link.

3. A relay method for monitoring and controlling common public radio interface (CPRI) links that are links using CPRIs functioning as interfaces for connecting multiple relay devices included in a radio base station, the relay method comprising:
    detecting a CPRI link that is disconnected by monitoring, via the CPRI links, relay information containing communication data and control data that contains connection state information on the CPRI links;
    distributing a control content with respect to each CPRI link in accordance with a connecting location of a CPRI link in which a link disconnection is detected at the detecting; and
    transmitting only the control data of the relay information that is transmitted via the detected CPRI link, wherein
    the detecting includes notifying the transmitting of CPRI links connected to multiple relay devices that share the relay device on the downlink side, when detecting a link disconnection in a downlink direction of a CPRI link connected to a relay device on a downlink side,
    the transmitting includes transmitting only the control data to the relay devices connected to the notified CPRI links,
    the detecting includes notifying the transmitting of the CPRI link, in which a link disconnection is detected, as a first CPRI link and notifying the transmitting of a CPRI link connected to a relay device on a downlink side as a second CPRI link, when detecting a link disconnection in a downlink direction of a CPRI link connected to a relay device on an uplink side, and
    the transmitting includes transmitting only the control data to the relay device connected to the notified first CPRI link and transmitting, as the relay information from the relay device connected to the first CPRI link, only the control data to the relay device connected to the notified second CPRI link.

4. The relay method according to claim 3, wherein
the detecting includes notifying the transmitting of the CPRI link, in which a link disconnection is detected, as a first CPRI link and notifying the transmitting of a CPRI link connected to a relay device on a downlink side as a second CPRI link, when detecting a link disconnection in an uplink direction of a CPRI link connected to a relay device on a downlink side,
the transmitting includes transmitting only the control data to the relay device connected to the notified first CPRI link and transmitting, as the relay information from the relay device connected to the first CPRI link, only the control data to the relay device connected to the notified second CPRI link,
the detecting includes notifying the transmitting of a CPRI link connected to a relay device on a downlink side, when detecting a link disconnection in an uplink direction of a CPRI link connected to a relay device on an uplink side, and
the transmitting includes transmitting, as relay information from a relay device connected to the detected CPRI link in which a link disconnection is detected, only the control data to the relay device connected to the notified CPRI link.

5. A computer-readable, non-transitory medium storing a relay program for monitoring and controlling common public radio interface (CPRI) links that are links using CPRIs functioning as interfaces for connecting multiple relay devices included in a radio base station, the relay program causing a computer to execute a process comprising:
detecting a CPRI link that is disconnected by monitoring, via the CPRI links, relay information containing communication data and control data that contains connection state information on the CPRI links;
distributing a control content with respect to each CPRI link in accordance with a connecting location of a CPRI link in which a link disconnection is detected at the detecting; and
transmitting only the control data of the relay information that is transmitted via the detected CPRI link, wherein
the detecting includes notifying the transmitting of CPRI links connected to multiple relay devices that share the relay device on the downlink side, when detecting a link disconnection in a downlink direction of a CPRI link connected to a relay device on a downlink side,
the transmitting includes transmitting only the control data to the relay devices connected to the notified CPRI links,
the detecting includes notifying the transmitting of the CPRI link, in which a link disconnection is detected, as a first CPRI link and notifying the transmitting of a CPRI link connected to a relay device on a downlink side as a second CPRI link, when detecting a link disconnection in a downlink direction of a CPRI link connected to a relay device on an uplink side, and
the transmitting includes transmitting only the control data to the relay device connected to the notified first CPRI link and transmitting, as the relay information from the relay device connected to the first CPRI link, only the control data to the relay device connected to the notified second CPRI link.

6. The computer-readable, non-transitory medium according to claim 5, wherein
the detecting includes notifying the transmitting of the CPRI link, in which a link disconnection is detected, as a first CPRI link and notifying the transmitting of a CPRI link connected to a relay device on a downlink side as a second CPRI link, when detecting a link disconnection in an uplink direction of a CPRI link connected to a relay device on a downlink side,
the transmitting includes transmitting only the control data to the relay device connected to the notified first CPRI link and transmitting, as the relay information from the relay device connected to the first CPRI link, only the control data to the relay device connected to the notified second CPRI link,
the detecting includes notifying the transmitting of a CPRI link connected to a relay device on a downlink side, when detecting a link disconnection in an uplink direction of a CPRI link connected to a relay device on an uplink side, and
the transmitting includes transmitting, as relay information from a relay device connected to the detected CPRI link in which a link disconnection is detected, only the control data to the relay device connected to the notified CPRI link.

* * * * *